US011260774B2

(12) United States Patent
Naidenov

(10) Patent No.: US 11,260,774 B2
(45) Date of Patent: Mar. 1, 2022

(54) MODULAR TRANSPORTATION SEAT FRAME

(71) Applicant: Freedman Seating Company, Chicago, IL (US)

(72) Inventor: Dimitar Naidenov, Chicago, IL (US)

(73) Assignee: Freedman Seating Company, Chicago, IL (US)

( * ) Notice: Subject to any disclaimer, the term of this patent is extended or adjusted under 35 U.S.C. 154(b) by 0 days.

(21) Appl. No.: 16/846,617

(22) Filed: Apr. 13, 2020

(65) Prior Publication Data

US 2021/0316638 A1 Oct. 14, 2021

(51) Int. Cl.
*B60N 2/01* (2006.01)
*B60N 2/24* (2006.01)

(52) U.S. Cl.
CPC ............ *B60N 2/012* (2013.01); *B60N 2/242* (2013.01)

(58) Field of Classification Search
CPC ..... B60N 2/012; B60N 2/242; B64D 11/0648
USPC .......... 297/451.4, 452.18, 249, 452.2, 451.3, 297/236; 248/188.1; 244/118.6
See application file for complete search history.

(56) References Cited

U.S. PATENT DOCUMENTS

| 3,230,005 | A | * | 1/1966 | Staples | A47C 7/68 297/160 |
| 3,460,791 | A | | 8/1969 | Judd | |
| 3,482,875 | A | * | 12/1969 | Barecki | A47C 7/185 297/452.22 |
| 3,729,226 | A | * | 4/1973 | Barecki | A47B 91/08 297/232 |
| 5,409,186 | A | | 4/1995 | Chow | |
| 5,558,309 | A | * | 9/1996 | Marechal | B64D 11/0693 244/118.5 |
| 5,829,836 | A | * | 11/1998 | Schumacher | B60N 2/06 297/257 |
| 8,647,544 | B2 | | 2/2014 | Burch | |
| 9,650,145 | B2 | | 5/2017 | Lambert | |
| 10,124,899 | B2 | | 11/2018 | Mansouri et al. | |
| 10,343,780 | B2 | | 7/2019 | Portoles et al. | |
| 10,392,115 | B2 | | 8/2019 | Le et al. | |
| 10,414,504 | B2 | | 9/2019 | Roderwald et al. | |
| 10,501,189 | B2 | * | 12/2019 | Malligere | F16B 2/10 |

(Continued)

FOREIGN PATENT DOCUMENTS

| CA | 2540908 A1 | * | 12/2006 | ............. B60N 2/242 |
| DE | 2715548 A1 | * | 10/1978 | ............. B62D 31/02 |
| DE | 3147045 A1 | * | 5/1983 | ............. B60R 22/26 |

(Continued)

*Primary Examiner* — Milton Nelson, Jr.
(74) *Attorney, Agent, or Firm* — Greenberg Traurig, LLP

(57) ABSTRACT

A transportation seat support apparatus includes a frame configured to support a transportation seat. The frame includes an attachment portion configured to attach to a wall of a transportation vehicle, and at least one beam extending from the attachment portion at a first end and terminating at a second end. The transportation seat support apparatus further includes a pedestal configured to support the frame. The pedestal includes at least one leg portion configured to attach to a floor of the transportation vehicle, and at least one aperture configured to telescopically receive the second end of the at least one beam. The at least one beam is slidably movable within the at least one aperture.

23 Claims, 18 Drawing Sheets

(56) References Cited

U.S. PATENT DOCUMENTS

2006/0290180 A1    12/2006   Belair et al.
2010/0320826 A1    12/2010   Wilson et al.

FOREIGN PATENT DOCUMENTS

| EP | 0076242 A1 * | 4/1983 | ............... B61D 1/04 |
| EP | 1266790 A2 * | 12/2002 | ............... B60N 2/70 |
| EP | 3152114 B1 | 12/2017 | |
| WO | 9423996 A1 | 10/1994 | |

* cited by examiner

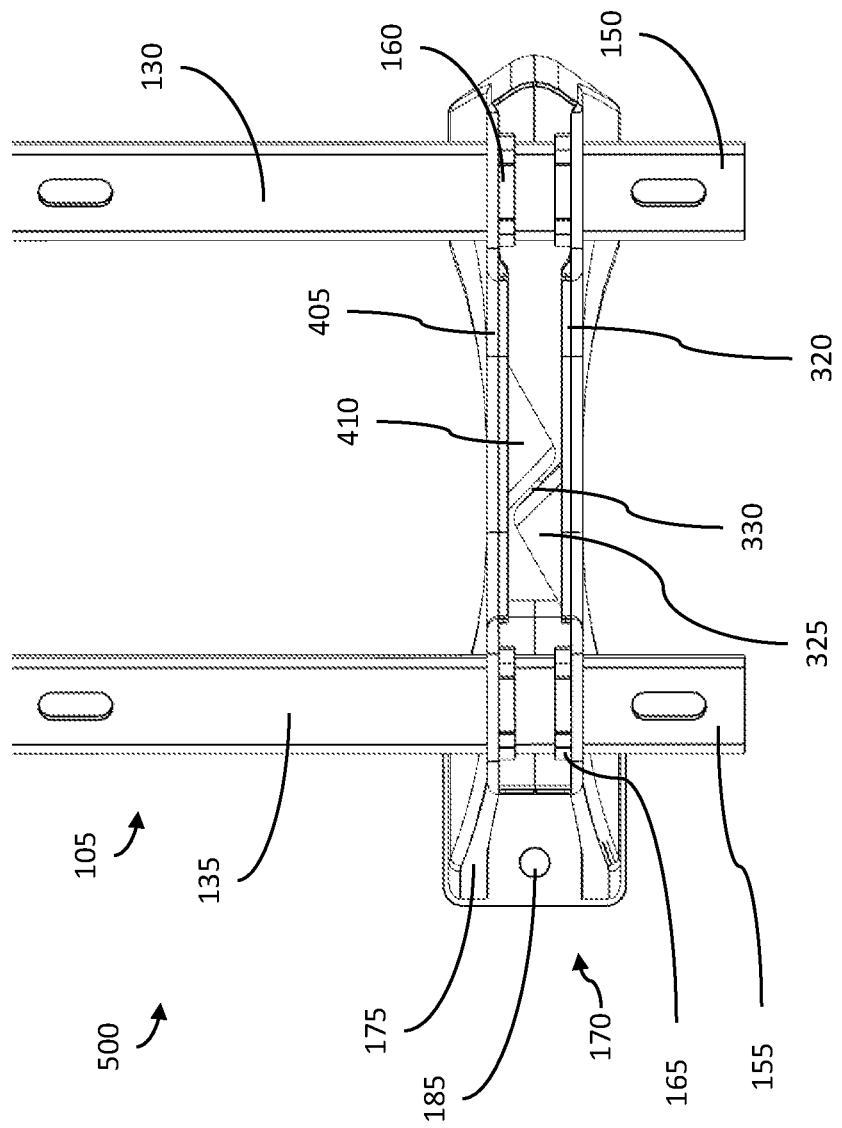

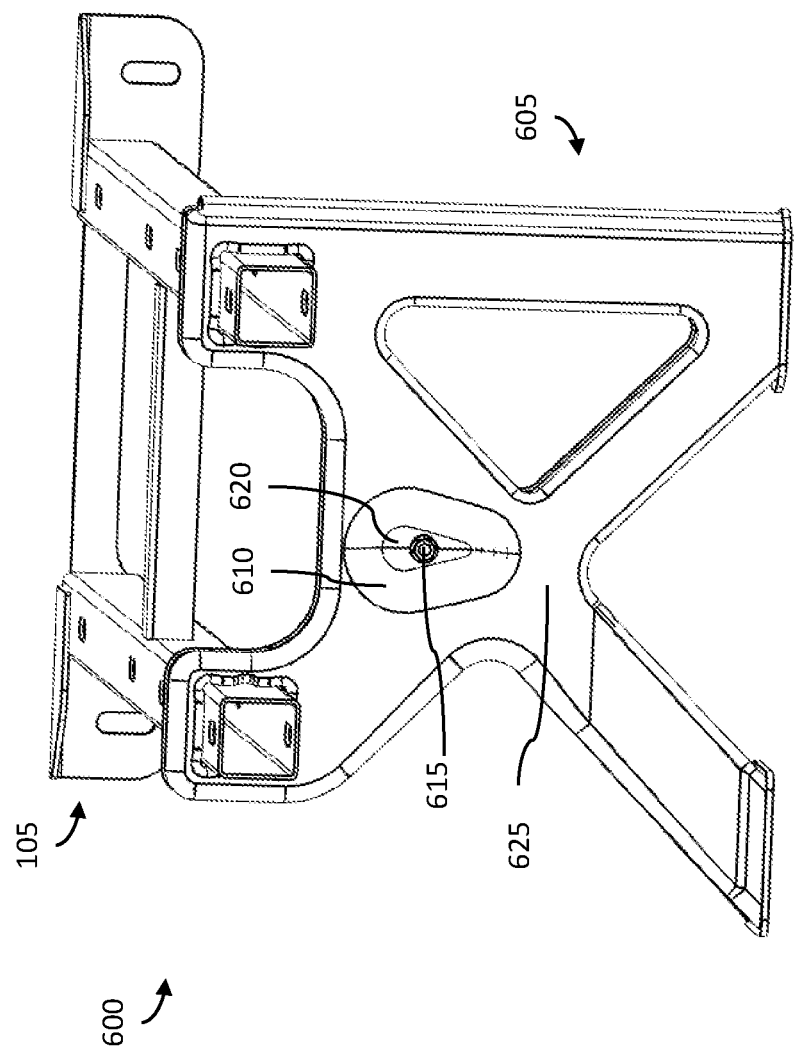

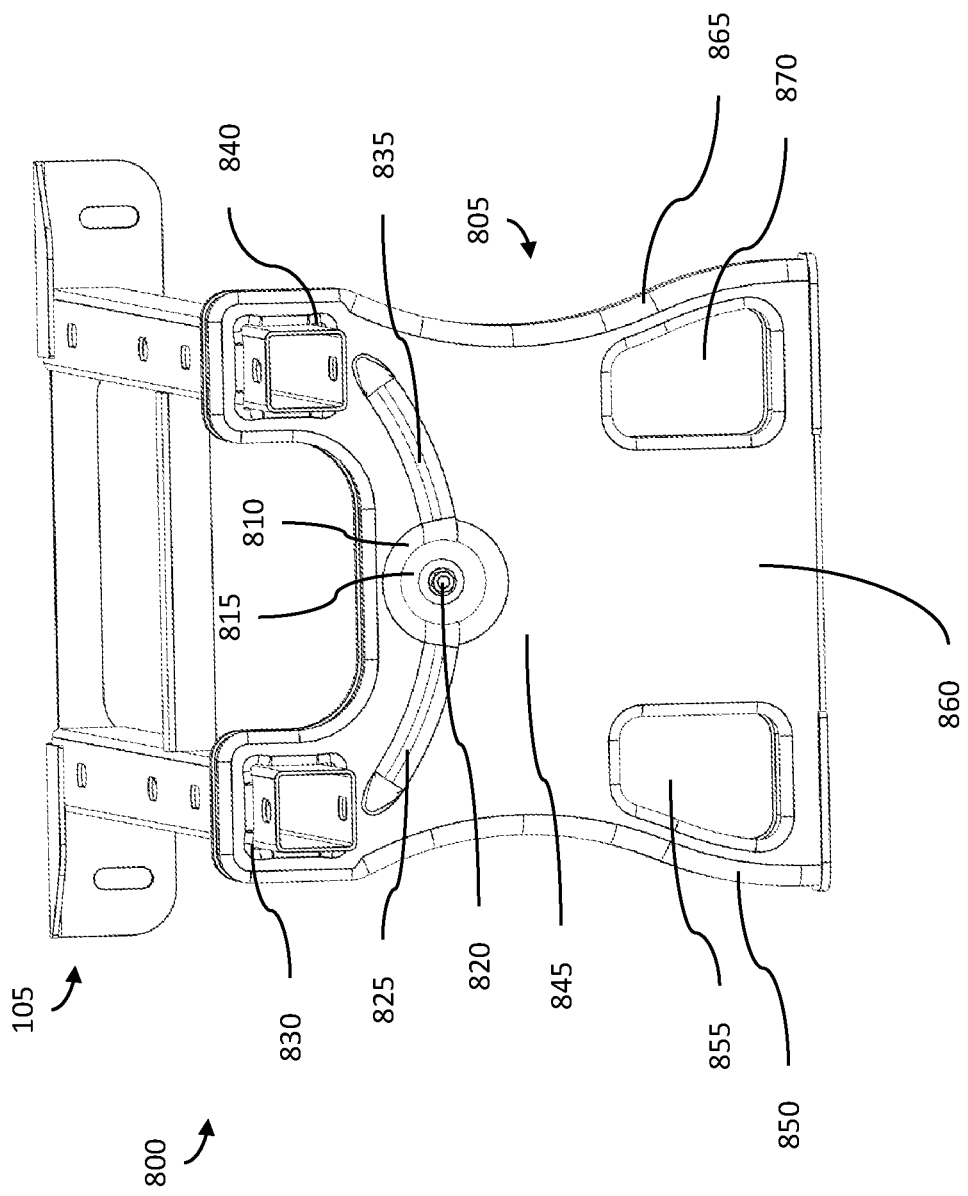

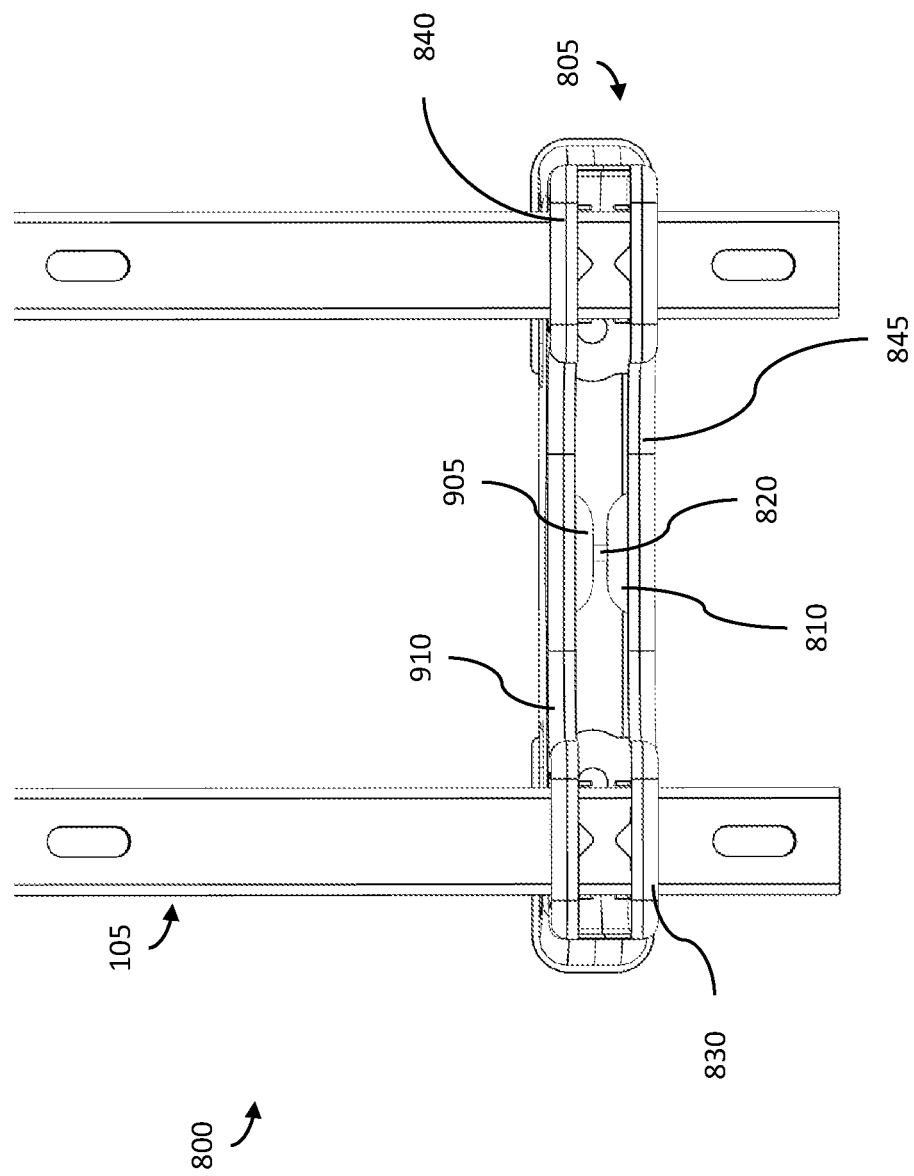

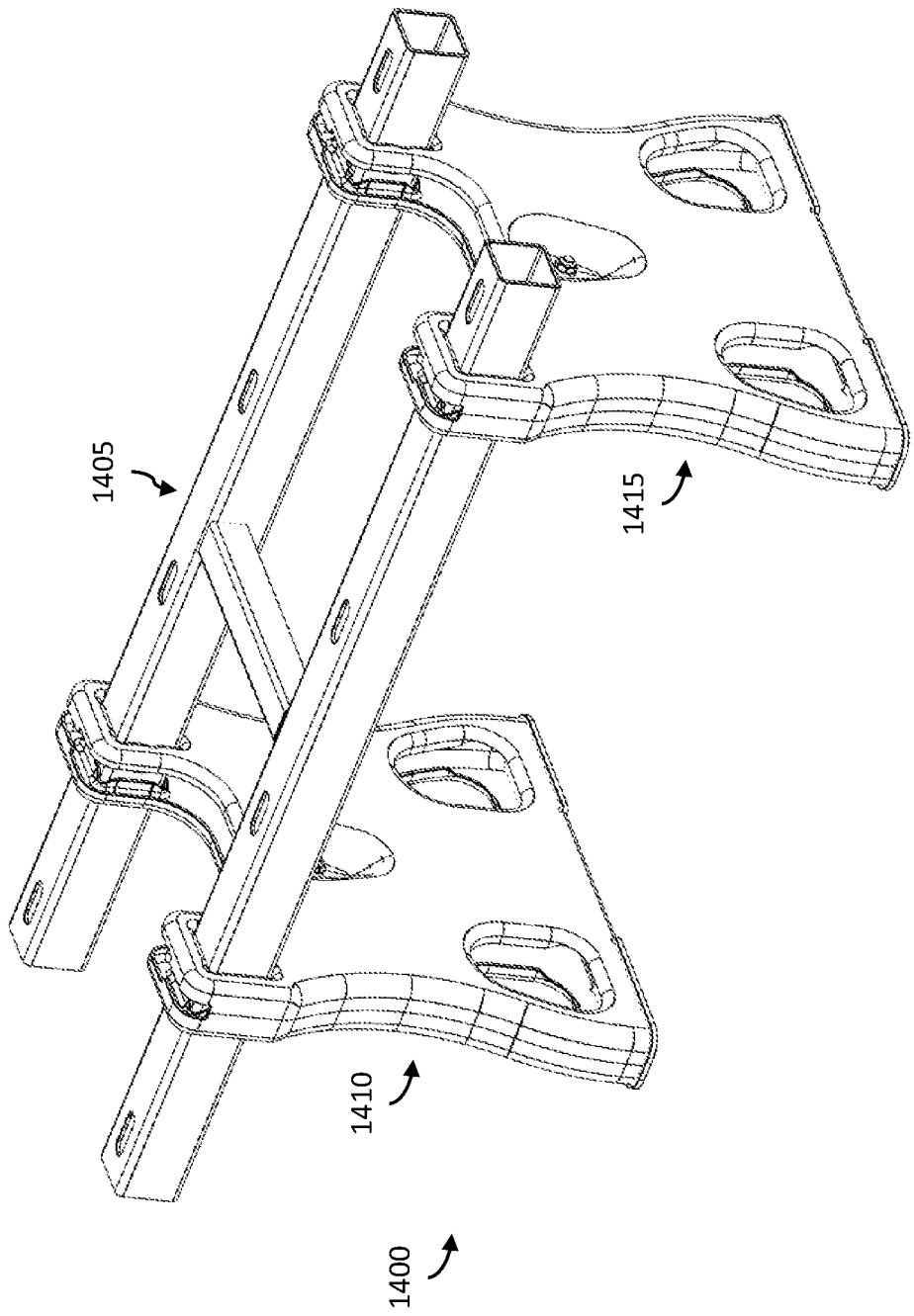

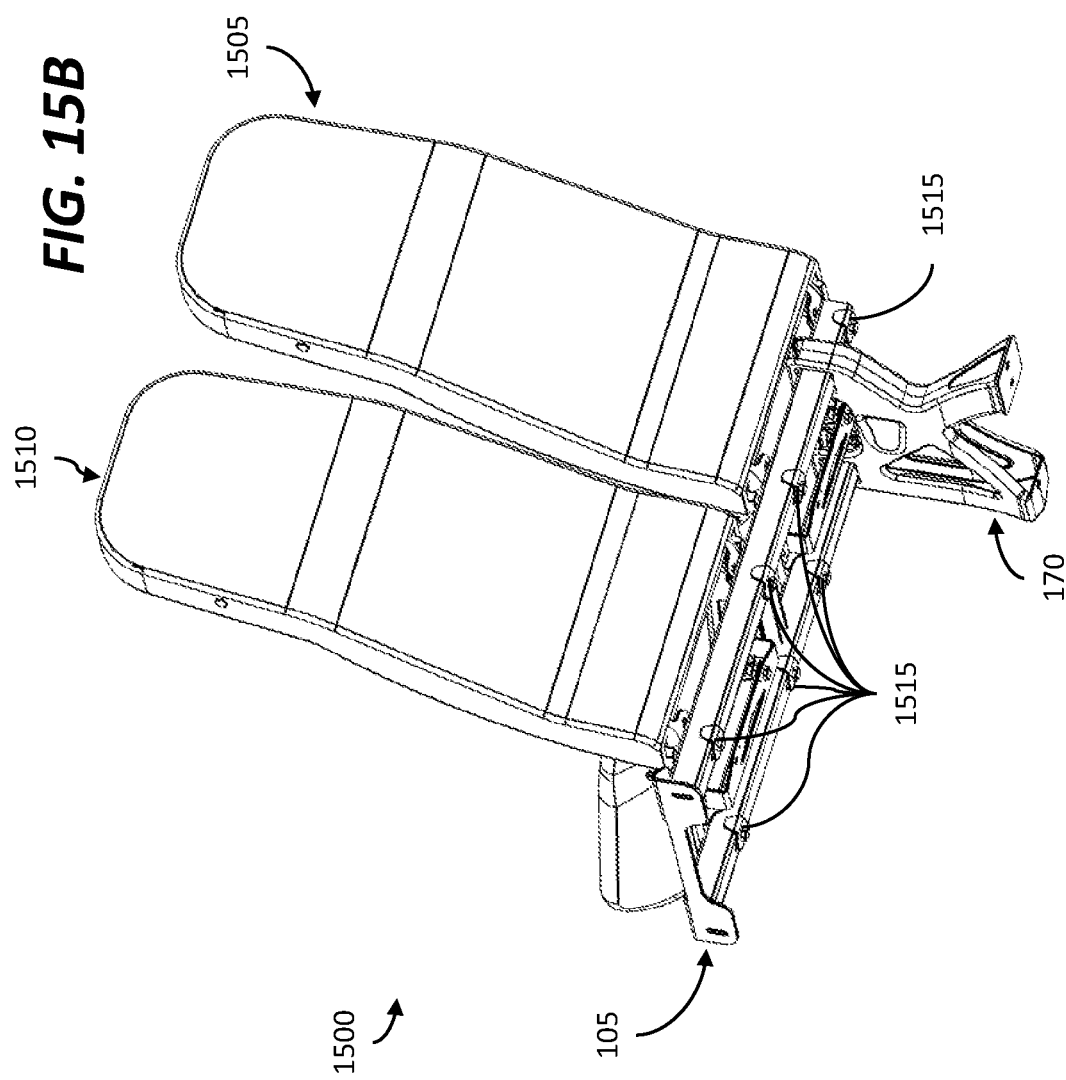

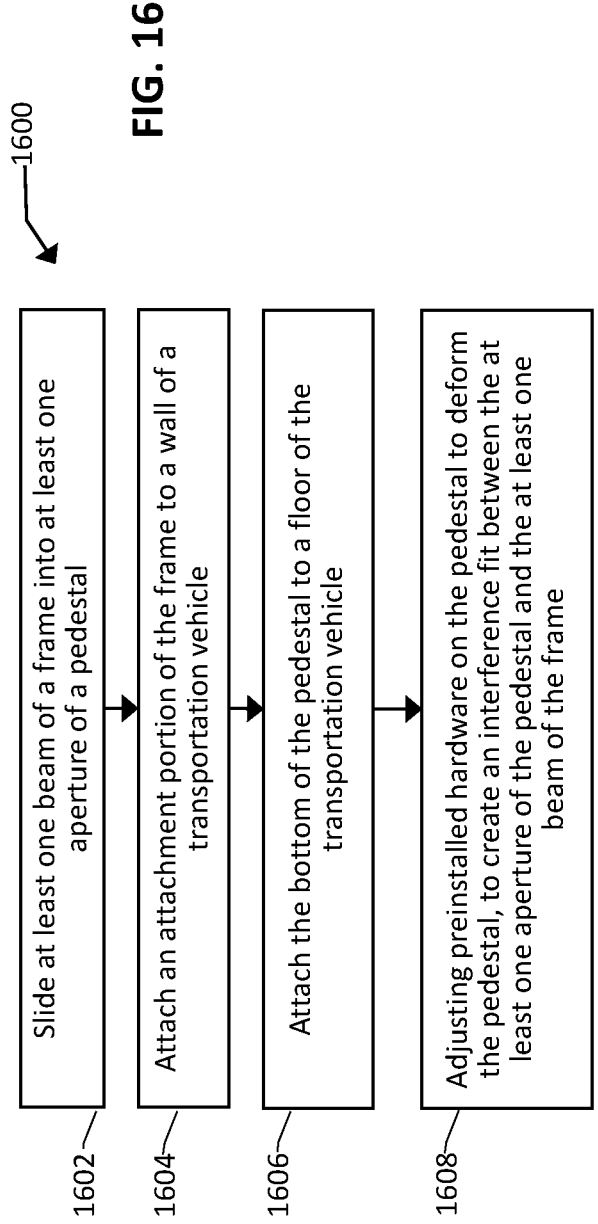

MODULAR TRANSPORTATION SEAT FRAME

FIELD OF THE DISCLOSURE

This disclosure relates to methods, systems, and apparatuses for a transportation seat support in, e.g., a passenger bus, car, or other vehicle.

BACKGROUND

Buses, boats, cars, trucks, planes, trains, mass transit vehicles, or other types of transportation vehicles generally include numerous seats. Those seats are installed into a vehicle and supported by various types of structural supports so that the seats may bear weight of passengers seated thereon, will not move relative to other portions of the vehicle, and often have various features for the safety and/or comfort of passengers.

SUMMARY

An example embodiment of a transportation seat support apparatus includes a frame configured to support a transportation seat. The frame includes at least one beam extending from a first end and terminating at a second end. The transportation seat support apparatus further includes a pedestal configured to support the frame. The pedestal includes at least one leg portion configured to attach to a floor of the transportation vehicle, and at least one aperture configured to telescopically receive the second end of the at least one beam. The at least one beam is slidably movable within the at least one aperture.

An example method for installing a transportation seat support includes sliding at least one beam of a frame into at least one aperture of a pedestal configured to support the frame. The at least one beam includes a first end connected to an attachment portion of the frame and a second end opposite the first end. The second end is slid into the at least one aperture. The method further includes attaching the attachment portion of the frame to a wall of a transportation vehicle. The frame is configured to support a transportation seat. The method further includes attaching the pedestal to a floor of the transportation vehicle.

Another example method includes sliding a first end of a first beam of a frame and a first end of a second beam of the frame into a first aperture and a second aperture of a first pedestal, respectively. The first pedestal is configured to support the frame, and the first beam includes a second end opposite the first end while the second beam includes a second end opposite the first end. The method further includes sliding the second end of the first beam and the second end of the second beam into a first aperture and a second aperture of a second pedestal, respectively, in which the second pedestal is configured to support the frame. The method further includes attaching the first pedestal and the second pedestal to a floor of a transportation vehicle. The method further includes adjusting preinstalled first hardware on the first pedestal to deform the first pedestal upon adjustment of said hardware, causing an interference fit between the first and second apertures of the first pedestal and the first and second beams. The method further includes adjusting preinstalled second hardware on the second pedestal to deform the second pedestal upon adjustment of said second hardware, causing an interference fit between the first and second apertures of the second pedestal and the first and second beams.

BRIEF DESCRIPTION OF THE DRAWINGS

FIG. 5 is a top partial perspective view of the example first embodiment modular transportation seat frame of FIG. 1.

FIG. 6 is a right side top perspective view of a second example embodiment of a modular transportation seat frame.

FIG. 8 is a right side top perspective view of a third example embodiment of a modular transportation seat frame.

FIG. 9 is a top partial perspective view of the third example embodiment modular transportation seat frame of FIG. 8.

FIG. 14 is a perspective view of a sixth example embodiment of a modular transportation seat frame with a frame and two pedestals configured to telescopically receive the frame.

FIG. 15B is a rear, bottom side perspective view of the first example embodiment of a modular transportation seat frame of FIG. 1, with seats installed thereon.

FIG. 16 is a flow chart illustrating an example method for installing a modular transportation seat frame in a transportation vehicle.

DETAILED DESCRIPTION

Figure 1:
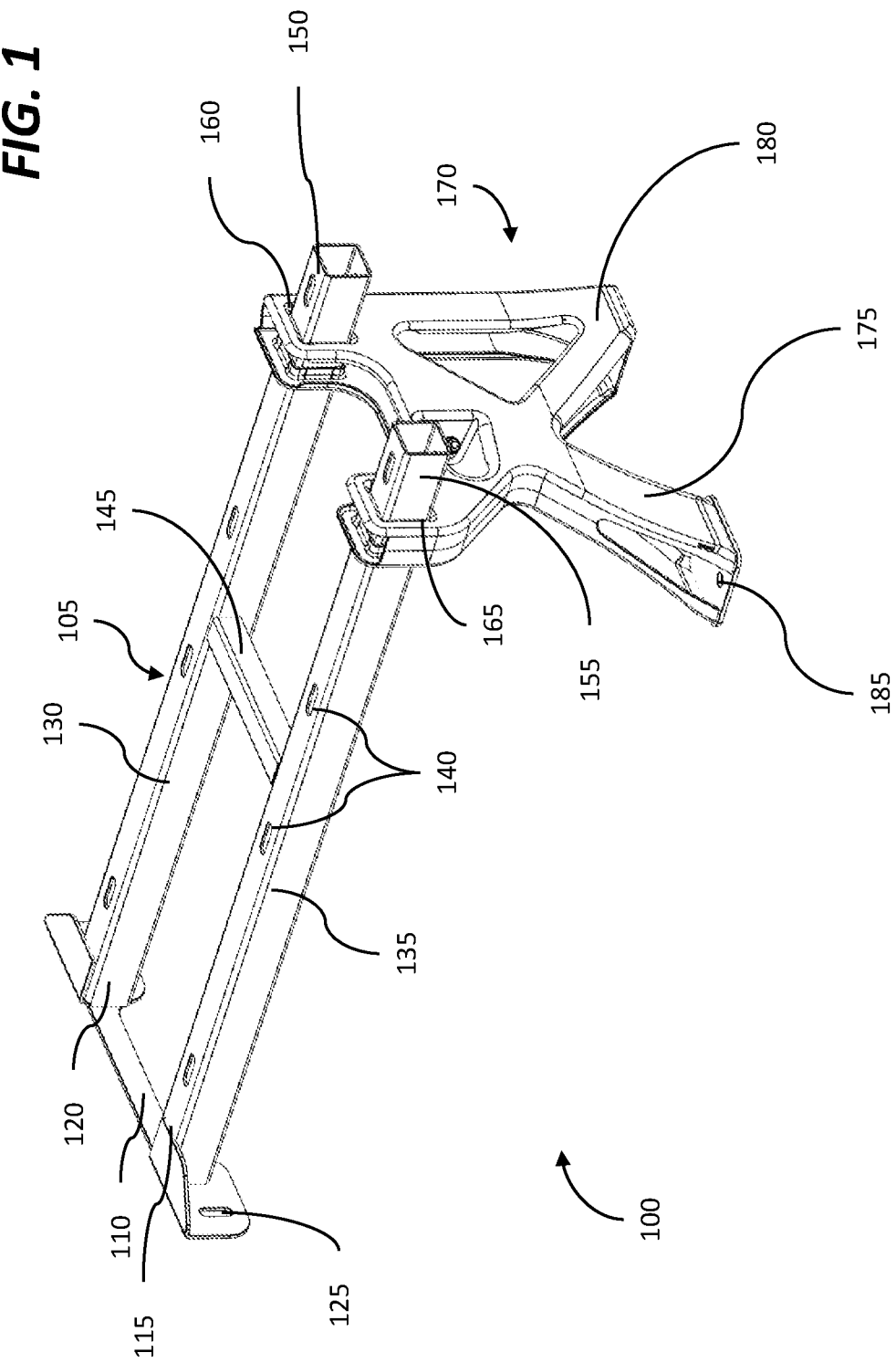
FIG. 1 is a perspective view of a first example embodiment of a modular transportation seat frame.

Buses, boats, cars, trucks, airplanes, trains, mass transit vehicles, or other types of transportation vehicles include numerous seats. Those seats are typically supported by structural supports that are attached to the vehicle in one of several ways. For example, seat supports in a commercial passenger bus may be attached to both a floor and/or a wall of an interior of the commercial passenger bus, so that passenger seats are often supported thereon within the interior of the commercial passenger bus. Such structural supports often are specifically designed for the type of vehicle in which the supports will be installed, so that the seats properly fit within the vehicle, properly fit the type of seats desired, avoid wheel wells, etc.

Improved structural support systems, apparatuses, and methods as described herein provide modular transportation seat frames and methods for installing such frames that advantageously may be installed in various types of transportation vehicles, in various sizes of transportation vehicles, and in various orientations/configurations within a given transportation vehicle. In other words, the modular transportation seat frames and methods for installing them described herein may be compatible with several types of transportation vehicles to minimize the need for transportation seat specialization. Advantageously, the modular transportation seat frames described herein may therefore be more easily, efficiently, and cheaply manufactured and/or installed more easily into a transportation vehicle.

Described herein are various embodiments of modular transportation seat frames that include a frame portion that has a first end for attaching the frame portion to a wall of a transportation vehicle. The frame portion may support a seat of a transportation vehicle attached thereto. The seat may be, for example, a conventional seat assembly used for a transportation vehicle. Two support beams may extend from the first end of the frame portion (which frame portion is attachable to a wall) to a second end of the frame portion. The two support beams may have two respective free (or unattached) ends. The free ends of the support beams may be telescopically received by or inserted into apertures in a leg or pedestal portion of the modular transportation seat frame. The pedestal may be oriented upright so that it supports the frame portion above the floor of a transportation vehicle. The free ends of the two support beams may then slide within the apertures of the pedestal portion. In this way, the pedestal may be positioned at different locations with respect to the frame portion, and the two support beams may be easily inserted into the apertures providing for efficient installation of the modular transportation seat frame. The pedestal portion bears the weight of, and supports, the frame portion upon which a seat may be mounted.

Described herein are also various embodiments of modular transportation seat frames that include a frame portion that has two support beams that extend to each of a first and second end of the frame portion, so that both of the first and second ends include two respective free (or unattached) ends of the two support beams (making four free beam ends total). In this way, each end of the frame may be telescopically received by or inserted into apertures of a leg or pedestal portion of a modular transportation seat frame. Accordingly, these frame portions may be configured to be supported by two or more pedestal portions, instead of connecting to a wall and being supported by one or more pedestal portions. In other words, a frame portion that may be telescopically received by or inserted into apertures of pedestals on both ends may be adequately supported by two or more pedestals without being attached to a wall. Advantageously, the same or similar pedestal portions described herein may be used with and compatible with frame portions configured to attach to a wall and frame portions configured to be supported only by two or more pedestals (e.g., not configured to be attached to a wall).

The modular transportation seat frames described herein have various advantages over other seat frame systems. For example, a pedestal portion may be slid along the support beams of the frame portion such that the pedestal portion may be adjusted to be at any position along the length of the frame portion. Once the frame portion is secured to the wall and within the openings/apertures of the pedestal portion, and the pedestal portion is secured to the floor, the modular transportation seat frame may be used in a transportation vehicle without further securing the frame portion to the pedestal portion. This enhanced installation capability reduces labor effort and costs for installing seats into transportation vehicles, and reduces the number of parts and tools required to assemble the seat frames, while yielding vehicle seats that comply with federal safety standards. As a result, both parts and labor requirements can be reduced, for savings in both installation time and raw materials costs. In addition, since the pedestal portion can be positioned at varying positions along the frame portion, the pedestal portion location may be adjusted as needed, based on the shape, size, contours, etc. of the transportation vehicle floor or other space constraints (e.g., wheel wells, heaters, space for passengers' baggage, etc.). With other seat frame designs that do not have a variable location capability regarding the adjustable pedestal portion, custom frame pieces may have to be fabricated, which, in turn, increase the complexity and cost of installing seating in a transportation vehicle as well as the cost of manufacturing the seating and for keeping track of the varying custom pieces that must be installed in specific places within a given transportation vehicle. By contrast, the seat frame design disclosed herein can be shipped to vehicle manufacturers in smaller boxes with fewer materials. Additional advantages of the methods, systems, and apparatuses for a modular transportation seat frame and installation thereof are further described here within this application.

FIG. 1 of the drawings is a perspective view of a first example embodiment of modular transportation seat frame 100. Modular transportation seat frame 100 includes frame 105 and pedestal 170. Frame 105 includes an attachment portion 110 at a first end of frame 105 that is configured to attach to a wall of a transportation vehicle. For example, attachment portion 110 includes hole 125 in a surface of attachment portion 110 that may receive hardware for mounting or otherwise attaching frame 105 to a wall of a transportation vehicle. Attachment portion 110 may generally be flat in shape, such that it has a flat surface that may rest up against a wall of a transportation vehicle. In other words, the surface of attachment portion 110 that is attachable to a wall of a transportation vehicle may be oriented, in an installed position, to be generally perpendicular to the ground on which a transportation vehicle sits, and similarly may be generally parallel with the wall of a transportation vehicle to which attachment portion 110 is actually attached. In various embodiments, attachment portion 110 may have various other shapes, configurations, etc. such that attachment portion 110 may be properly mounted to walls of transportation vehicles that have varying configurations, and such that attachment portion 110 may be mounted to a wall of varying transportation vehicles using different types of hardware.

Frame 105 further includes two beams, first beam 130 and second beam 135, that are connected to attachment portion 110 at points 120 and 115, respectively. The connection may be a weld, hardware connection, an inherent connection made during forming of frame 105, or any other type of connection, such that first beam 130, second beam 135, and attachment portion 110 make up integrally connected frame 105, as a modular transportation seat frame for supporting a transportation seat. First beam 130, second beam 135, and attachment portion 110 in the example embodiment of FIG. 1 therefore generally form U-shaped frame 105, with attachment portion 110 serving as the base of the U-shaped member, and first beam 130 and second beam 135 serving as the upper arms of the U-shape. In this way, first beam 130 and second beam 135 are oriented generally perpendicular to attachment portion 110, as shown in FIG. 1. Although a U-shape frame is shown in FIG. 1, other shapes may be formed by a frame in various embodiments.

Frame 105 also includes lateral support member 145, which is attached to both first beam 130 and second beam 135. Lateral support member 145 is oriented generally perpendicular to both first beam 130 and second beam 135, and is oriented generally parallel to attachment portion 110. Lateral support member 145 is attached to first beam 130 and second beam 135 at approximately the midpoint between the first end and the second end of first beam 130 and second beam 135. In other words, lateral support member 145 is located approximately midway between the ends of the beams, where first beam 130 and second beam 135 are joined to both attachment portion 110 and a first free end 150 of first beam 130 and a second free end 155 of second beam 135. If desired, any excess length of first beam 130 and second beam 135 may be trimmed after installation of the modular transportation seat frame. In such an instance, lateral support member 145's placement at the approximate midpoint of the length of first and second beams 130 and 135 may change as a function of whether excess beam length is removed after installation of frame 105 (e.g., portions of first and second beams 130 and 135 are removed because they extend through the apertures significantly past pedestal 170). Lateral support member 145 provides additional structural support for frame 105, and prevents first beam 130 and second beam 135 from moving away from one another and/or potentially deforming attachment portion 110. In various embodiments, frame 105 may include multiple lateral support members instead of or in addition to lateral support member 145. In various embodiments, also, lateral support member 145 or other lateral support members may be shaped differently than lateral support member 145, or one or more lateral support beams may be joined to first beam 130 and second beam 135 at different locations than that shown in FIG. 1. In various embodiments, frame 105 may also have no lateral support beams. In addition, other configurations of a frame portion of a modular transportation seat frame may also be possible that are shaped differently and have different or additional components than frame 105 shown in FIG. 1.

First free end 150 and second free end 155 may be telescopically received by first aperture 160 and second aperture 165, respectively, of pedestal 170. In this way, pedestal 170 may bear the weight of and may support frame portion 105. As discussed herein, frame 105 is configured to support a conventional transportation seat assembly (not shown in FIG. 1), so pedestal 170 also may support, via frame 105, the weight of a seat assembly and/or any passenger or object thereon.

Pedestal 170 also includes first leg portion 175 and second leg portion 180, which are each configured to attach to the floor of a transportation vehicle. For example, hole 185 of first leg portion 175 may be used to bolt or otherwise attach pedestal 170 to the floor of a transportation vehicle. Second leg portion 180 may also have one or more holes (not visible in FIG. 1) and first leg portion 175 may have additional holes (not visible in FIG. 1) for further securing pedestal 170 to the floor of a transportation vehicle.

First aperture 160 and second aperture 165 are configured to telescopically receive first free end 150 of first beam 130 and second free end 155 of second beam 135, respectively. In this way, frame 105 is slidably movable within first and second apertures 160 and 165. In the example of FIG. 1, first beam 130 and second beam 135 may move within first and second apertures 160 and 165 all the way until pedestal 170 comes into contact with lateral support member 145. In other words, frame 105 may move within apertures 160 and 165 approximately half of the length of frame 105. Relatedly, different configurations of, the absence of, and/or different placement of lateral support member 145 may enable frame 105 to move greater or less distance within first and second apertures 160 and 165. In other words, pedestal 170 may be slid to different points along frame 105 depending on placement of, configuration of, and/or existence of lateral support member 145. In this way, different amounts of movement for placing pedestal 170 with respect to frame 105 may be achieved based on design choices associated with any lateral support member(s). For example, if there is no lateral support member, pedestal 170 may slide all the way from first and second free ends 150 and 155 to attachment portion 110. Accordingly, because respective frame 105 and pedestal 170 may be arranged at different positions in relation to one another, modular transportation seat frame 100 may be easily installed and configured for varying applications, transportation vehicles, and unique configurations within transportation vehicles. For example, a bus may have a feature or obstruction on a floor that requires different placement of pedestal 170 with respect to frame 105 than other seats installed in the bus. Modular transportation seat frame 100 advantageously provides for pedestal 170 to be installed at various positions along frame 105 in order to accommodate various needs or preferences for different types of transportation vehicles without the need for varied or custom pieces seat frames.

The first aperture 160 and second aperture 165 of pedestal 170 are configured to telescopically receive first free end 150 of first beam 130 and second free end 155 of second beam 135, respectively. In order to do so, the shape of first and second apertures 160 and 165 are configured to correspond to the shape of free ends 150 and 155 of first and second beams 130 and 135. In the example of FIG. 1, first and second apertures 160 and 165 and free ends 150 and 155 have a generally square cross-sectional shape. In various embodiments, the cross-sectional shape may be different than a square, or may be a square with additional features such as a notch or tongue/groove so that frame 105 and pedestal 170 fit together in a specific way. In various embodiments, the cross-sectional shape may generally be a circle, an oval, an ellipse, a triangle, or any other shape.

The modular transportation seat frames proposed herein, including the example embodiment of FIG. 1, have various advantages over other seat frame systems. For example, since a pedestal (e.g., pedestal 170 of FIG. 1) may be slid along a frame portion (e.g., frame 105 of FIG. 1), the pedestal may be adjusted to be at any position along the length of the frame portion. Once the frame portion is secured to a wall of a transportation vehicle and within the apertures of the pedestal, and the pedestal is secured to the floor, the modular transportation seat frame may also be advantageously used in a transportation vehicle without further securing the frame portion to the pedestal. In other words, the frame portion and the pedestal are configured to structurally support a transportation seat without the use of additional hardware connecting the frame portion and the pedestal. This enhanced installation capability reduces labor effort and costs for installing seats into transportation vehicles, and reduces the number of parts and tools required to assemble the seat frames because no additional hardware is necessary to structurally affix or otherwise integrally connect the frame portion to the pedestal. As a result, both parts and labor requirements for installing a seat frame may be reduced using the modular transportation seat frame described herein, for savings in both installation time and raw materials costs. In addition, since the pedestal can be positioned at varying positions along the frame portion, the pedestal location may be advantageously adjusted as desired, based on the shape or size of the transportation vehicle floor or other space constraints (e.g., wheel wells, heaters, passenger baggage storage areas, etc.). With other seat frame designs that do not have such a variable location capability regarding the adjustable pedestal, custom frame pieces may have to be fabricated, increasing the complexity and cost of installing seating in a transportation vehicle.

Another advantage of the modular transportation seat frames and methods for installing them described herein is that the modular transportation seat frames may be compatible with being installed either curb-side or street-side within a transportation vehicle. That is, even though seats in a transportation vehicle are often mirrored in multiple aisles within a transportation vehicle, the embodiments of modular transportation seat frames described herein may be used on both sides of the transportation vehicle. For example, modular transportation seat frame 100 of the example embodiment shown in FIG. 1 may be installed on a left-side (street-side) of a bus (for countries like the United States that drive on the right side of the road), where attachment portion 110 attaches to a left-side (street-side) wall of the bus and pedestal 170 is set off to the right of the left-side (street-side) wall. In such an arrangement, pedestal 170 is oriented with first leg portion 175 pointing toward the rear of the bus. The same modular transportation seat frame 100 may be used on a right-side (curb-side) of a bus by flipping the orientation of pedestal 170 (or frame 105) such that (in contrast to the orientation shown in FIG. 1) first free end 150 is inserted into second aperture 165 and second free end 155 is inserted into first aperture 160. In other words, apertures 160 and 165 may telescopically receive free ends 150 and 155 from either side of pedestal 170. In this way, attachment portion 110 may also be operably attached to a right-side (curb-side) wall of the bus, and first leg portion 175 of pedestal 170 still points toward the rear of the bus. As such, the same modular transportation seat frame 100 may be used on either side of a transportation vehicle, cutting down on complexity of parts needed to install seat supports in a transportation vehicle.

The various embodiments of modular transportation seat frame described herein are also advantageously efficient to ship before installation, as the frame portion and pedestal may both be laid flat with respect to one another for shipping, or even may be shipped separately. Accordingly, more seat frames may be transported in less space than seat frames where the components cannot be laid out flat (e.g., already the frame portion and the pedestal are already connected) or the components require extra hardware to attach the components (e.g., the extra hardware may add weight and/or take up more space).

Figure 2:
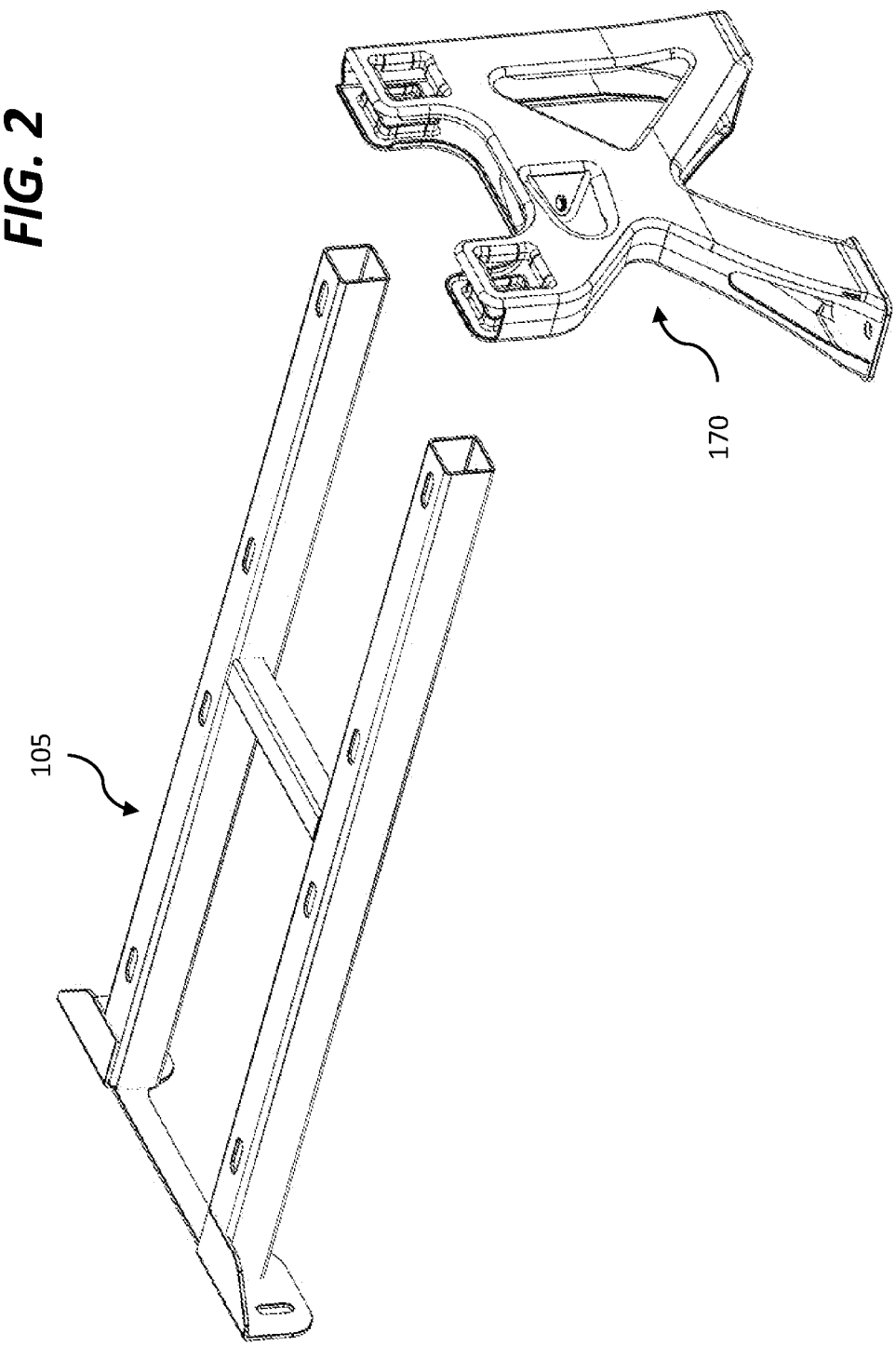
FIG. 2 is an exploded perspective view of the first example embodiment modular transportation seat frame of FIG. 1.

FIG. 2 is an exploded perspective view 200 of the first example embodiment modular transportation seat frame 100 of FIG. 1. As shown, free ends 150 and 155 of frame 105 correspond to and are insertable into apertures 160 and 165 of pedestal 170. As is evident from FIG. 2, the two main portions of modular transportation seat frame 100 (e.g., pedestal 170 and frame 105) are easily separable before the modular transportation seat frame is installed in a transportation vehicle.

Although the various embodiments of the modular transportation seat frame described herein do not necessarily require any hardware to fasten a frame portion (e.g., frame 105 of FIG. 1) to a pedestal portion (e.g., pedestal 170 of FIG. 1), it is noted that, in some implementations, during travel, because there may be no structural affixation between the frame portion and the pedestal, it is possible that a frame portion could vibrate and rattle within the apertures/openings of a pedestal portion after a modular transportation seat frame has been installed in a transportation vehicle. Without adding any further structural support between the frame portion and the leg or pedestal portion, such vibration or rattling may be addressed by creating an interference fit between the frame portion and the apertures/openings of the pedestal portion. For example, in various embodiments, as further shown in and described below with respect to FIGS. 3-13, hardware or other mechanism or methods may be used to cause the pedestal to deform to create an interference fit between the frame and pedestal portions of a modular transportation seat frame. In addition, as described further herein, if any hardware is used to deform the pedestal portion, such hardware may be pre-installed in the pedestal portion of a modular transportation seat frame. Although various examples in FIGS. 3-15 are described herein that have preinstalled hardware to deform the pedestal portion and its apertures to create an interference fit with a frame portion, other embodiments may use various methods, apparatuses, systems, etc. to achieve a similar result. For example, instead of a deformation of the pedestal portion to create the interference fit, beams of a frame portion may be deformed (e.g., expanded within the apertures of the pedestal potion) to create an interference fit. In another example, a tool (e.g., mallet, hammer, specialized tool for deforming the pedestal portion and/or frame portion) may be used to cause the deformation rather than hardware preinstalled in the pedestal and/or frame portions. As just one example, such a tool may deform the portions of a pedestal around the aperture to alter the shape of the aperture to create an interference fit. In other words, any method, system, or apparatus that alters the relationship of the apertures of the pedestal with respect to the beam ends of the frame portion telescopically received therein may be used to reduce potential rattling between the pedestal and frame portions of a modular transportation seat frame described herein. Even if, in various embodiments, hardware is used to reduce rattling, no additional hardware may be used or may be needed to structurally integrate or connect the frame portion and the pedestal portion of the modular transportation seat frames as described herein.

Because modular transportation seat frame 100 is separable into pedestal 170 and frame 105 (e.g., as shown in FIG. 2), pedestal 170 and frame 105 may be shipped separately before installation of modular transportation seat frame 100. This may greatly reduce space used to ship the component parts of modular transportation seat frame 100. Even if pedestal 170 and frame 105 were shipped together in same packaging, space needed to ship used to ship them may still be less than if modular transportation seat frame 100 were shipped preassembled. In addition, as described herein, the modular transportation seat frame may not use hardware for assembly (e.g., to connect frame 105 and pedestal 170), or may only have preinstalled hardware to reduce rattling already installed on one of frame 105 or pedestal 170. As such, shipping modular transportation seat frame 100 may not include any loose hardware pieces floating around in the box. This is advantageous at least because such piece may be noisy, may be lost easily, may add weight to the shipping package(s), may damage a finish on the frame, or may require additional packaging to secure hardware within a box if it is desired to not have them float in the box.

Figure 3:
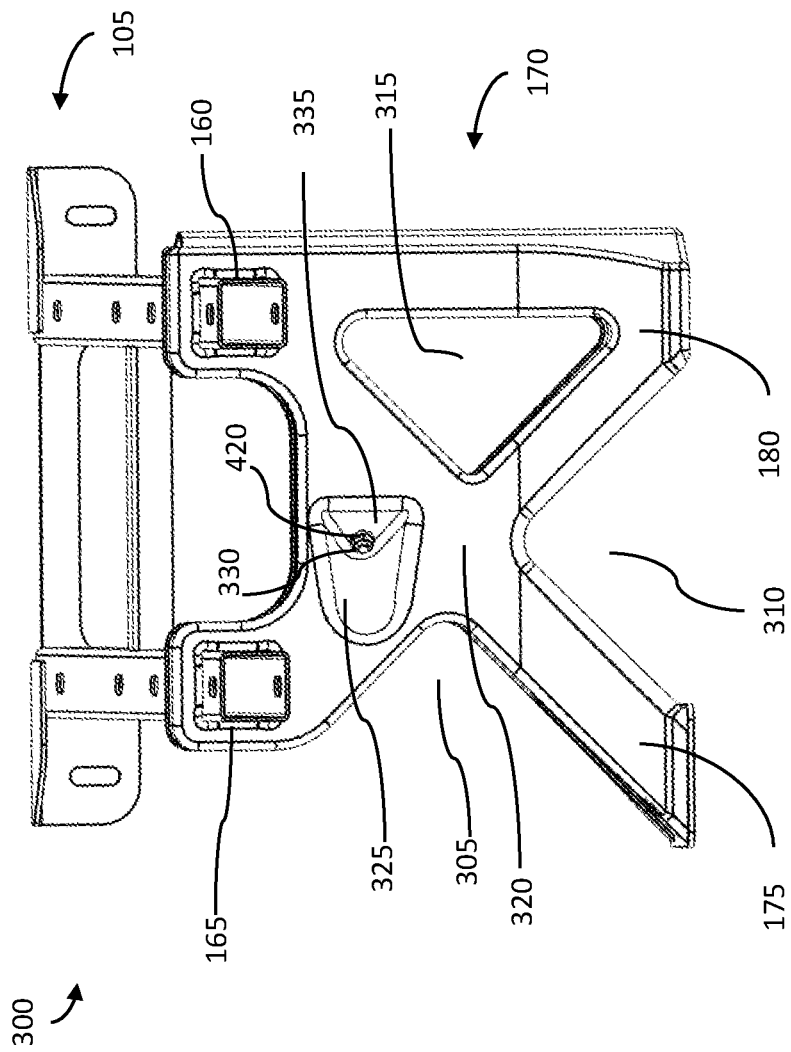
FIG. 3 is a right side top perspective view of the first example embodiment modular transportation seat frame of FIG. 1.
Figure 4:
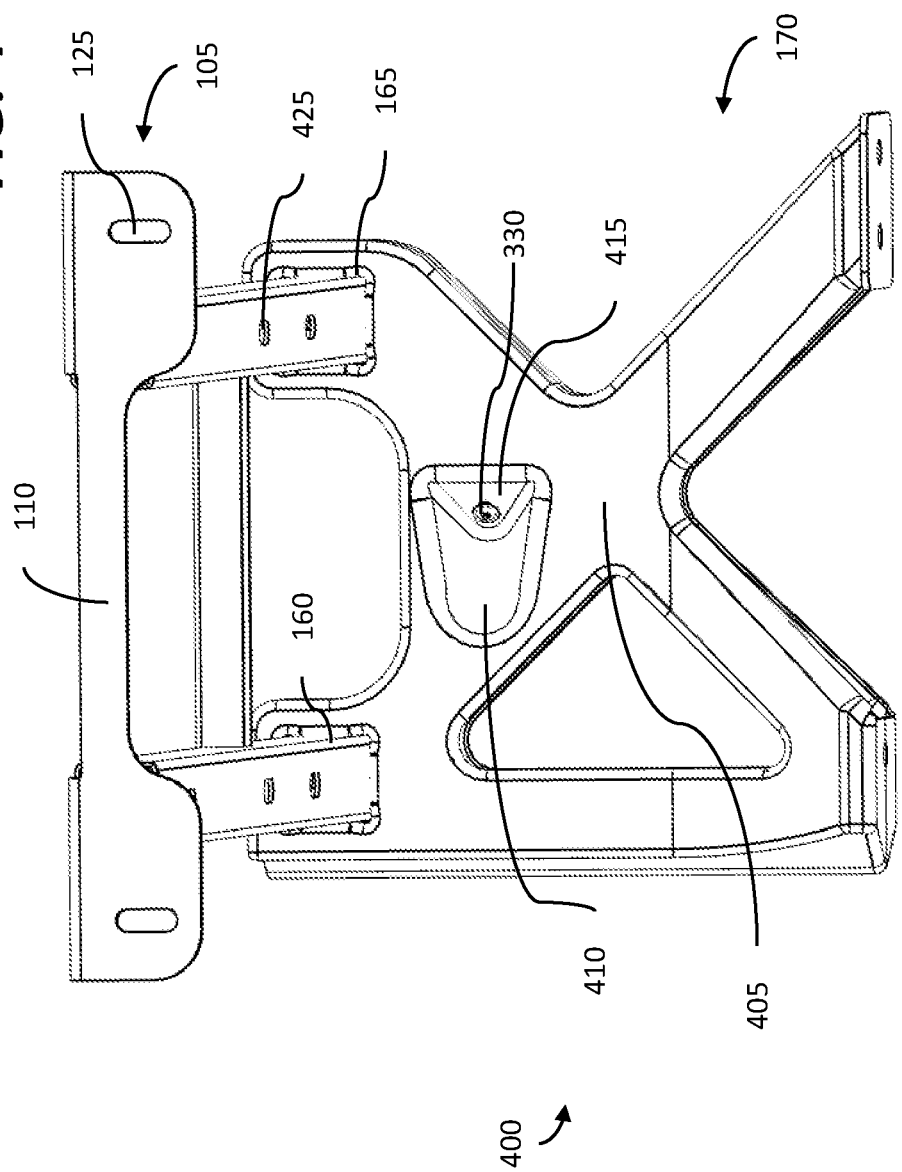
FIG. 4 is a left side bottom perspective view of the first example embodiment modular transportation seat frame of FIG. 1.

FIG. 3 is a right side top perspective view 300 of the first example embodiment modular transportation seat frame 100 of FIG. 1. FIG. 4 is a left side bottom perspective view 400 of the example embodiment modular transportation seat frame 100 of FIG. 1. FIG. 5 is a top partial perspective view 500 of the example first embodiment modular transportation seat frame 100 of FIG. 1.

The right side top perspective view 300 of FIG. 3 shows frame 105 and pedestal 170 of FIG. 1. Pedestal 170 includes first aperture 160, second aperture 165, first leg portion 175, and second leg portion 180 as described with respect to FIG. 1. Furthermore, first surface 320 of pedestal 170 is shown in FIG. 3 (which opposes second surface 405 shown in FIG. 4). Pedestal 170 and first and second surfaces 320 and 405 include spaces 305, 310, and 315 that are triangular in shape. These spaces 305, 310, and 315 reduce the amount of material used to manufacture pedestal 170, but are configured such that pedestal 170 still offers proper structural support for frame 105 and any seat assembly installed thereon (as well as any passenger or other object that may be placed on the seat). Similarly, as shown in FIG. 5, there is space between first surface 320 and second surface 405 that further reduces the amount of raw material used to form pedestal 170.

Pedestal 170 may be formed from two metal extruded halves that are welded together, forming the space between first surface 320 and second surface 405. This may result in pedestal 170 being lighter than a solid pedestal of similar dimensions. In addition, this construction of pedestal 170 provides a symmetric shape across a horizontal cross-section (where the cross-sectional plane is parallel with the ground) of the pedestal 170. This symmetrical cross-section is advantageous in combined loading, is more weight efficient, and allows for use of lower grade material than a pedestal that does not have a symmetrical horizontal cross-section. First leg portion 175 is configured to angle toward the rear of the transportation vehicle with respect to frame 105. This angled arrangement may provide for more foot/leg space for a passenger in another seat (or a passenger getting into or out of a seat) behind pedestal 170, as well as providing a shape that may even serve as a foot rest for a passenger in a seat behind pedestal 170. As shown in FIG. 3, leg portion 175 extends out further toward the rear of the transportation vehicle than the rest of modular transportation seat frame 100. Therefore, leg portion 175 may bear a weight of frame 105, a seat mounted thereon, and/or any load on the seat, including bearing that weight efficiently when the transportation vehicle accelerates. In addition, such an angled arrangement of leg portion 175 provides for a space between mounting holes of first leg portion 175 and second leg portion 180 that is wider than the rest of pedestal 170, such that pedestal 170 is not overly obtrusive to passengers sitting a seat behind pedestal 170, but still provides a wide base for mounting pedestal 170 to the floor of a transportation vehicle, resulting in a more stable pedestal 170.

As shown in FIGS. 3-5, free ends 150 and 155 of beams 130 and 135 have been inserted into apertures 160 and 165 of pedestal 170. Once frame 105 is inserted into apertures 160 and 165 as shown, modular transportation seat frame 100, pedestal 170 may be deformed to create an interference fit between apertures 160 and 165 of frame 105 and beams 130 and 135 of frame without the use of additional hardware that connects frame 105 and pedestal 170. In other words, the hardware described with respect to the example of FIGS. 3-5 below does not connect frame 105 and pedestal 170 in any way. Instead, the hardware that deforms pedestal 170 is installed (and may have been preinstalled before frame 105 and pedestal 170 were even assembled) only on pedestal 170 (and is functional to deform pedestal 170 as installed or preinstalled). In various embodiments, hardware to deform frame 105 may be installed only on frame 105, or hardware to deform frame 105 and/or pedestal 170 may be installed/preinstalled only on pedestal 170 or may be installed/preinstalled only on frame 105.

In the example shown in FIGS. 3-5, pedestal 170 is configured to deform such that the shape of apertures 160 and 165 change as a result of deformation of pedestal 170. In particular, as bolt 330 is tightened, first and second surfaces 320 and 405 of pedestal 170 are drawn together, deforming apertures 160 and 165 such that the shape of apertures 160 and 165 changes and creates an interference fit between apertures 160 and 165 and beams 130 and 135 telescopically received in apertures 160 and 165. This interference fit may prevent frame 105 from rattling within apertures 160 and 165 of pedestal 170.

First surface 320 includes boss (or recess) 325, which includes an angled surface 335 that is angled with respect to first surface 320 of pedestal 170. A hole in angled surface 335 allows bolt 330 to pass through angled surface 335 and toward second surface 405. Similarly, as shown in FIG. 4, pedestal 170 also includes second surface 405, which includes boss 410 with an angled surface 415. Angled surface 415 also includes a hole in which bolt 330 may pass. Nut 420 is also shown in FIG. 3 attached to the threads of bolt 330. In addition, holes (e.g., hole 425) are shown on the underside of frame 105, which may be further useful for attaching a seat assembly to frame 105 and may correspond to one of holes 140 shown in FIG. 1.

As shown in FIG. 5, angled surfaces 335 and 415 may be parallel to one another, and bolt 330 may extend from first boss 325 into second boss 410. In this way, bolt 330 may be restrained within first boss 325 on angled surface 335 and may be further restrained within second boss 410 on angled surface 415. Bolt 330 may be restrained within bosses 325 and 410 by nut 420 on a threaded region of bolt 330. Bolt 330/nut 420 combination may be preinstalled on pedestal 170. That is, the insertion of frame 105 into pedestal 170 and placement of frame 105 with respect to 170 (e.g., sliding frame 105 within apertures 160 and 165 of pedestal 170) may occur while bolt 330 may already be restrained within bosses 325 and 410 and nut 420 is fastened to the threaded region of bolt 330. However, bolt 330/nut 420 combination may not be tightened in a preinstalled configuration to a point where bolt 330/nut 420 combination deforms pedestal 170. In this way, frame 105 can be moved within apertures 160 and 165, and bolt 330/nut 420 combination may only be tightened after the desired configuration of pedestal 170 and frame 105 is achieved. Accordingly, an installer of modular transportation seat frame 100 does not need to place, locate, or otherwise attach bolt 330/nut 420 combination to pedestal 170. Rather, the only interaction the installer may need with respect to bolt 330/nut 420 combination may be to tighten bolt 330/nut 420 combination to create the interference fit between pedestal 170 and frame 105 because the hardware (e.g., bolt 330/nut 420 combination) came preinstalled on pedestal 170.

Bolt 330/nut 420 combination may be tightened (i.e., bolt 330 may be rotated with respect to nut 420 such that nut 420 moves closer to the head of bolt 330). In this way, first and second angled surfaces 335 and 415 of first and second bosses 325 and 410 (as well as surfaces 320 and 405) of pedestal 170 are drawn together. In other words, rotation of nut 420 and bolt 330 with respect to one another to draw nut 420 toward a head of bolt 330 may deform first surface 320 and second surface 405 of pedestal 170, thereby changing the shape of pedestal 170 and deforming apertures 160 and 165 to create an interference fit with beams 130 and 135 of frame 105. This deformation of pedestal 170, including with respect to apertures 160 and 165 through which frame 105 passes, creates the interference fit that may reduce or eliminate rattling between frame 105 and pedestal 170. The deformation of pedestal 170 may also include a twisting of pedestal 170 such that leg portion 175 may translate away from a wall side of a transportation vehicle (and toward an aisle) and leg portion 180 may translate toward a wall side of a transportation vehicle (and away from an aisle) because of the configuration of bosses 325 and 410. Because the deformation of pedestal 170 may include a twisting of the pedestal that may cause translation of leg portions 175 and 180 relative to one another, in various embodiments it may be advantageous to bolt pedestal 170 to the floor of a transportation vehicle before tightening bolt 330/nut 420 combination.

In addition, as shown in FIG. 5, the example embodiment of modular transportation seat frame 100 of FIGS. 1-5 has two surfaces (surfaces 320 and 405) through which apertures (apertures 160 and 165) pass. In other words, a first opening in first surface 320 and a corresponding second opening in second surface 405 together make up first aperture 160, and a third opening in first surface 320 and a corresponding fourth opening in second surface 405 together make up second aperture 165. Accordingly, each of the first and second openings that make up first aperture 160 telescopically receive first beam 130, and each of the third and fourth openings that make up second aperture 165 telescopically receive second beam 135. In various embodiments, the pedestal may have different configurations. For example, if a pedestal is solid such that there is no space between its outer surfaces, each aperture may be a continuous, single opening. In the example of FIGS. 1-5, tightening of bolt 330/nut 420 combination draws first and second surfaces 320 and 405 of pedestal 170 together, such that (1) the shape of the first and second openings that make up first aperture 160 change to create an interference fit between first aperture 160 and first beam 130 and/or (2) the relative positions and/or orientations of the first opening of first aperture 160 and the second opening of first aperture 160 change with respect to one another to create an interference fit between first aperture 160 and first beam 130. Similarly, the tightening of bolt 330/nut 420 combination draws first and second surfaces 320 and 405 of pedestal 170 together, such that (1) the shape of the third and fourth openings that make up second aperture 165 change to create an interference fit between second aperture 165 and second beam 135 and/or (2) the relative positions and/or orientations of the third opening of second aperture 165 and the third opening of second aperture 165 change with respect to one another to create an interference fit between second aperture 165 and second beam 135. In this way, first and second apertures 160 and 165 exert forces on first and second beams 130 and 135, respectively, when pedestal 170 deforms to create the interference fit.

Other mechanisms and/or methods for altering the relationship between a frame portion and a pedestal portion of a modular transportation seat frame to create an interference fit to reduce or eliminate rattling are contemplated herein. Other non-limiting example embodiments are discussed below and shown in FIGS. 6-15.

Figure 7A:
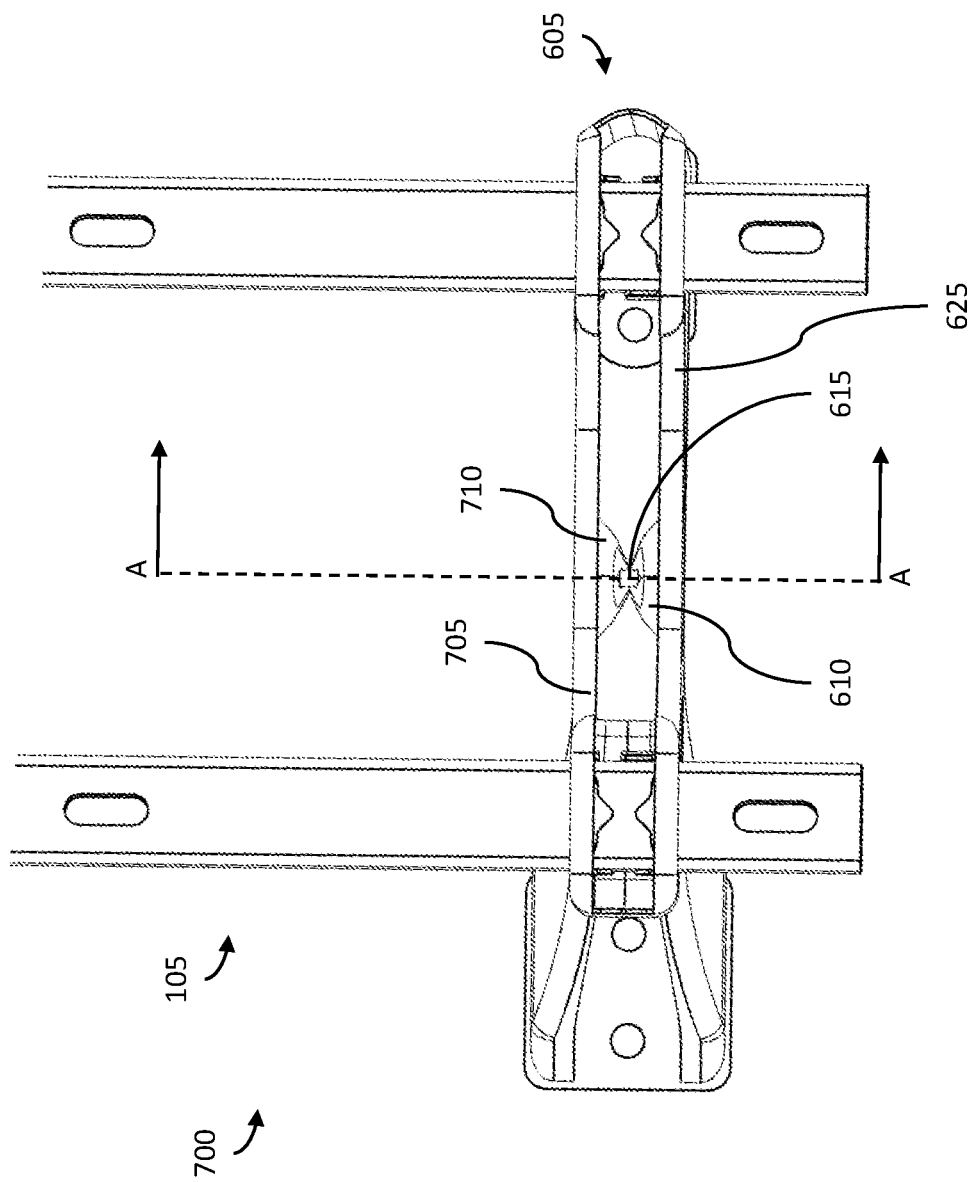
FIG. 7A is a top partial perspective view of the second example embodiment modular transportation seat frame of FIG. 6.
Figure 7B:
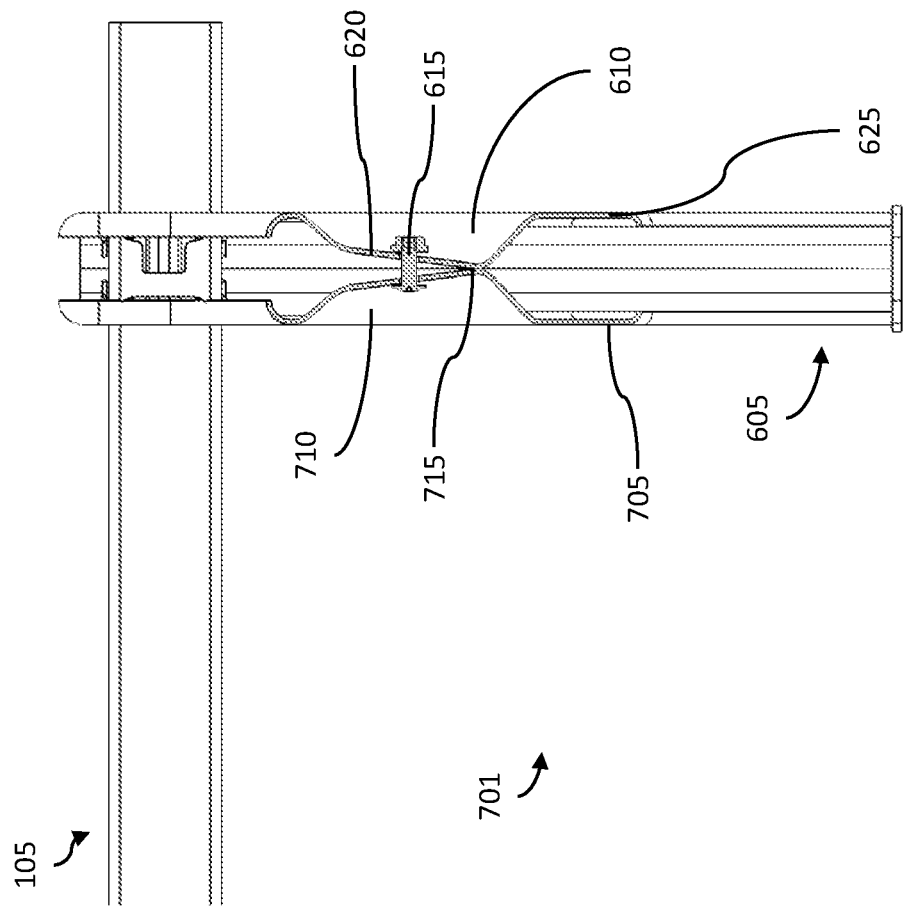
FIG. 7B is a cross-sectional view of the second example embodiment modular transportation seat frame of FIG. 7A.

FIG. 6 is a right side top perspective view of a second example embodiment of modular transportation seat frame 600. FIG. 7A is a top partial perspective view of second example embodiment modular transportation seat frame 600 of FIG. 6. FIG. 7B is a cross-sectional view 701 of the modular transportation seat frame 600 of FIGS. 6 and 7A. In particular, FIG. 7B shows a cross-sectional view from line A-A in the direction of the arrows as shown in FIG. 7A. Modular transportation seat frame 600 includes a frame portion that is similar to frame 105 of FIGS. 1-5. Pedestal 605 differs from pedestal 170 described above with respect to FIGS. 1-5. In particular, first and second bosses 610 and 710, which are part of first surface 625 and second surface 705 of pedestal 605, respectively, are configured differently to line up with one another. In other words, first and second bosses 610 and 710 mirror each other, and are oriented opposite to one another in similar positions on their respective first and second surfaces 625 and 705. Bosses 610 and 710 are also similar in shape, and each have a surface (e.g., a surface 620 shown in FIGS. 6 and 7B) within each respective boss 610 and 710 that touch at a point 715 and are then angled apart from one another, opening up toward the top of pedestal 605 as shown in the cross-section of pedestal 605 in FIG. 7B. Similar to pedestal 170 of FIGS. 1-5, pedestal 605 also includes bolt 615 and a nut (not shown) that is used to restrain bolt 615 and nut within holes in bosses 610 and 710. Again similar to frame 105 and pedestal 170 of FIGS. 1-5, bolt 615 and nut may be tightened to cause pedestal 605 to deform to create an interference fit between apertures of pedestal 605 and frame 105 by drawing opposed bosses 610 and 710 (and subsequently first and second surfaces 625 and 705) together to change the shape/configuration of the apertures of pedestal 605. Because of the configuration of the angled surfaces shown in FIG. 7B, point 715 acts a fulcrum when bolt 615 and nut are tightened, to cause the upper portions of pedestal 605 to be drawn together to deform the openings of pedestal 605. Unlike the bosses of pedestal 170 of FIGS. 1-5, bosses 610 and 710 of pedestal 605 are symmetrical and, when drawn together, cause uniform deformation of pedestal 605 without translation of the leg portions of pedestal 605 (as occurs in pedestal 170 of FIGS. 1-5). Accordingly, since the leg portions of pedestal 605 do not translate when pedestal 605 is deformed, it is not necessary for pedestal 605 to be fixed to a floor of a transportation vehicle before tightening bolt 615 and nut to deform pedestal 605. Thus, the deformation and tightening of bolt 615 and nut may be done before or after pedestal 605 is affixed to a floor of a transportation vehicle. In addition, because pedestal 605 is symmetrical and deforms generally symmetrically, pedestal 605 may be oriented the same, on either the street or curb side of a transportation vehicle.

FIG. 8 is a right side top perspective view of a third example embodiment modular transportation seat frame 800. FIG. 9 is a top partial perspective view of third example embodiment modular transportation seat frame 800 of FIG. 8. Modular transportation seat frame 800 includes frame 105 and pedestal 805 that is shaped differently than the pedestals of FIGS. 1-7 described above. Surface 845 is larger than the surfaces of pedestals 170 and 605, and includes different openings 855 and 870 and leg portions 850, 865, and 860 than pedestals 170 and 605. However, apertures 830 and 840 are similar in shape (e.g., generally square-shaped cross-sections) to the apertures of pedestals 170 and 605 so that it can still telescopically receive frame 105.

Like pedestal 170 and pedestal 605, pedestal 805 also includes two bosses: first boss 810 in first surface 845 and second boss 905 in second surface 910. Bolt 820 and a nut are also restrained within bosses 810 and 905, and may be preinstalled and tightened to draw bosses 810 and 905 (and thus surfaces 845 and 910) together to cause pedestal 805 to deform. Also, similar to pedestal 605, surface 815 of first boss 810 and a surface of second boss 905 through which bolt 820 passes are parallel to surfaces 845 and 910. In addition, bosses 810 and 905 are symmetrical to and oppose one another. Each of individual bosses 810 and 905 are also symmetrical along both an x and y axis, and in this example are circular in shape.

Curved channels 825 and 835 also extend out from opposing sides of each of bosses 810 and 905 toward apertures 830 and 840, respectively. In particular, curved channels 825 and 835 extend upward from each of bosses 810 and 905 toward apertures 830 and 840 in pedestal 805 that telescopically receive the beams of frame 105. Similar curved channels to curved channels 825 and 835 may also be located on second surface 910 of pedestal 805, mirroring curved channels 825 and 835.

Curved channels 825 and 835 may assist in deforming apertures 830 and 840 as bosses 810 and 905 (and subsequently surfaces 845 and 910) are drawn together due to tightening of bolt 820 and nut combination. In particular, curved channels 825 and 835 impart more rigidity into surfaces 845 and 910, such that deformation cause by drawing bosses 810 and 905 together is better translated toward apertures 830 and 840. In this way, the opposing two openings in surfaces 845 and 910 that make up aperture 830 move with respect to one another to a greater degree than the opposing two openings of aperture 830 would without channels 825 and 835. In so doing, curved channels 825 and 835 cause deformation of pedestal 805 to occur more at the edges of pedestal 805, rather than the deformation being more evenly distributed throughout pedestal 805. Accordingly, the opposing two openings in surfaces 845 and 910 that make up aperture 840 move with respect to one another to a greater degree than the opposing two openings of aperture 840 would without channels 825 and 835. Thus, the movement of these openings that form apertures 830 and 840 with respect to each other, effectively reduces the overall square-shaped cross-section of apertures 830 and 840, ultimately causing the interference fit between pedestal 805 and frame 105.

Figure 10:
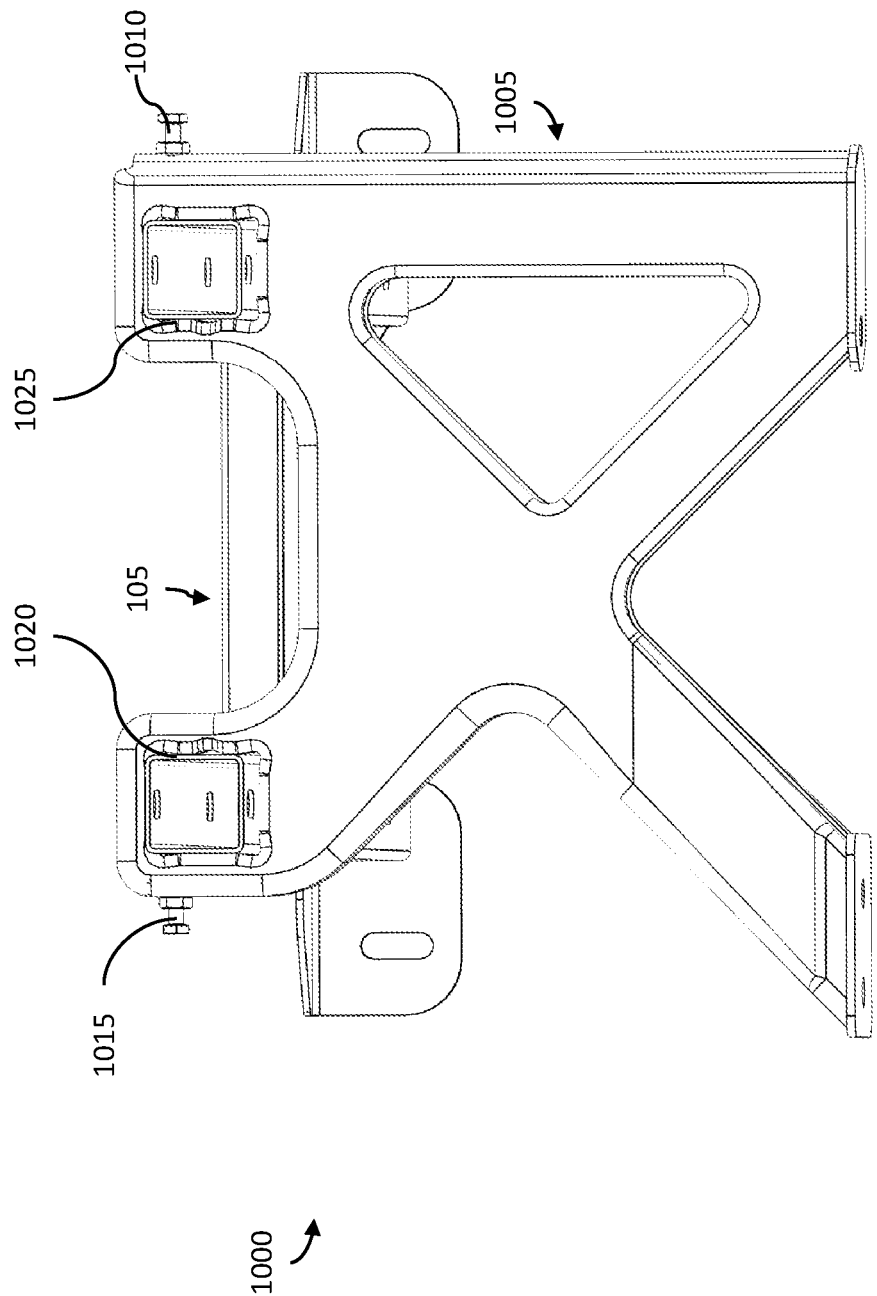
FIG. 10 is a right side top perspective view of a fourth example embodiment of a modular transportation seat frame.
Figure 11:
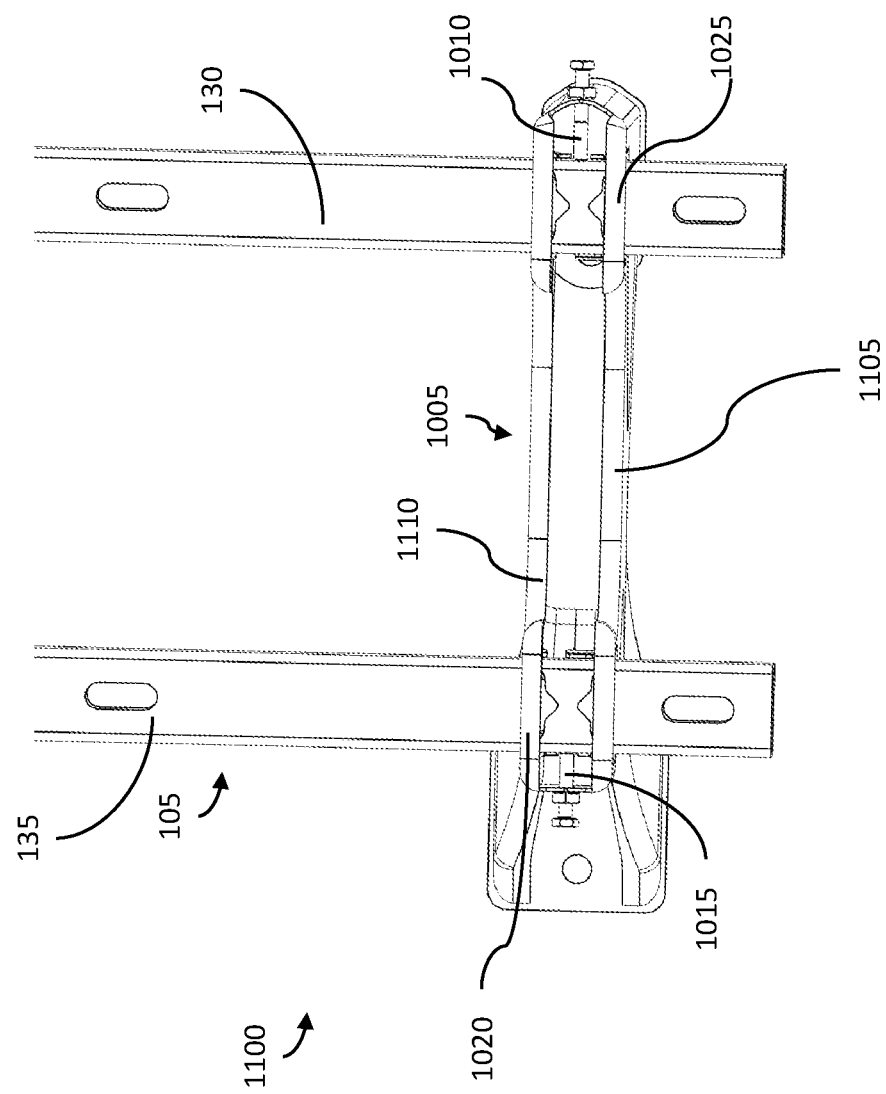
FIG. 11 is a top partial perspective view of the fourth example embodiment modular transportation seat frame of FIG. 10.

FIG. 10 is a right side top perspective view of a fourth example embodiment modular transportation seat frame 1000. FIG. 11 is a top partial perspective view 1100 of fourth example embodiment modular transportation seat frame 1000 of FIG. 10. Modular transportation seat frame 1000 includes frame 105 and pedestal 1005. Pedestal 1005 is shaped somewhat similarly to pedestal 170 of FIGS. 1-5 and pedestal 605 of FIGS. 6 and 7, except that there are no bosses or holes for a bolt in surfaces 1105 and 1110 of pedestal 1000, as in pedestals 170 and 605.

Instead of bosses, pedestal 1005 demonstrates a fourth example method for reducing or eliminating rattling: set screws 1015 and 1010 that may be tightened to push or press the beams of frame 105 within openings 1020 and 1025, respectively, to create an interference fit between frame 105 and pedestal 1005. Like the other examples of preinstalled hardware described herein, set screws 1015 and 1010 may be preinstalled on pedestal 1005, so that they only need be tightened once frame 105 is set to a desired location within pedestal 1005. In this embodiment, first surface 1105 and second surface 1110 are not drawn together to create an interference fit between pedestal 1005 and frame 105, as in the examples of FIGS. 1-9 described above.

Figure 12:
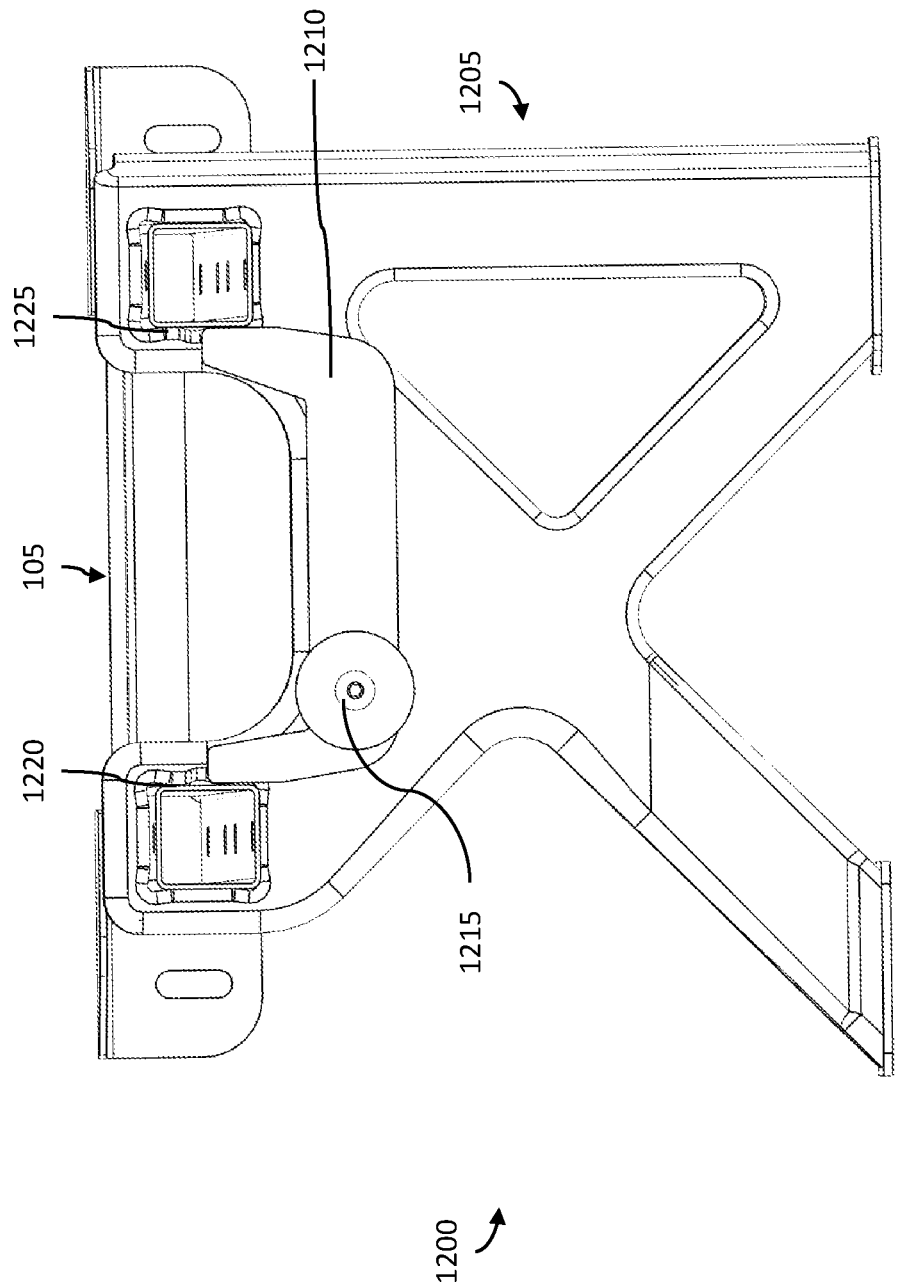
FIG. 12 is a right side top perspective view of a fifth example embodiment of a modular transportation seat frame.
Figure 13:
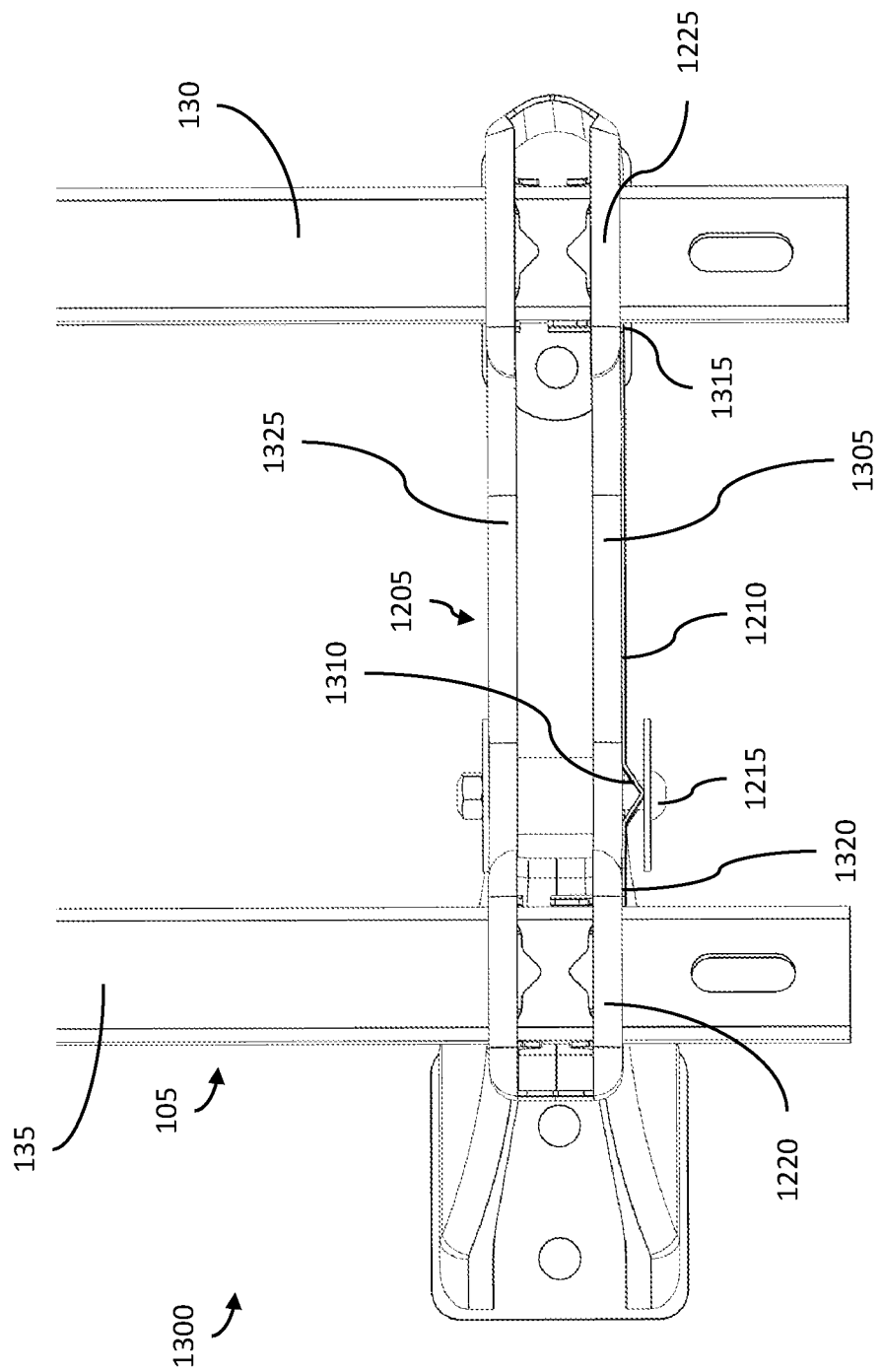
FIG. 13 is a top partial perspective view of the fifth example embodiment modular transportation seat frame of FIG. 12.

FIG. 12 is a right side top perspective view of a fifth example embodiment modular transportation seat frame 1200. FIG. 13 is a top partial perspective view of fifth example embodiment modular transportation seat frame 1200 of FIG. 12. Modular transportation seat frame 1200 includes frame 105 and pedestal 1205. Pedestal 1205 is shaped somewhat similarly to pedestal 170 of FIGS. 1-5 and pedestal 605 of FIGS. 6 and 7, except that there are no bosses in the main surfaces of pedestal 1000, as in pedestals 170 and 605. Pedestal 1205 is also shaped somewhat similarly to pedestal 1005 of FIGS. 10 and 11, except that first surface 1305 and second surface 1310 of pedestal 1205 each include corresponding holes configured for bolt 1215 to pass through. Bolt 1215 may be tightened in a nut/bolt combination similar to pedestals 170, 605, and 805 (e.g., the nut/bolt combination may be used in a pedestal without bosses).

In pedestal 1205, a mechanism for reducing or eliminating rattling is spring bracket 1210. Bolt 1215 is configured to be tightened to compress angled portion 1310 of spring bracket 1210. Angled portion 1310 is originally shaped in a triangular configuration as shown in FIG. 13. As bolt 1215 is tightened, angled portion 1310 is compressed, flattening out the triangular shape of angled portion 1310 and pushing first end 1315 and second end 1320 of spring bracket 1210 away from one another (and away from bolt 1215), functionally lengthening spring bracket 1210. In so doing, first end 1315 and second end 1320 of spring bracket 1210 press up against beams 130 and 135 of frame 105, such that frame 105 is deformed to create an interference fit with openings 1220 and 1225 of pedestal 1205. Accordingly, in contrast to various embodiments described herein where a pedestal is deformed around a frame to create an interference fit, here beams 130 and 135 of frame 105 are deformed by first and second ends 1315 and 1320 of spring bracket 1210 to create an interference fit between pedestal 1205 and frame 105. Spring bracket 1210 and bolt 1215, like other hardware used to create an interference fit described herein, may be preinstalled in pedestal 1205. In another embodiment, a spring bracket may be placed and configured to push surfaces 1305 and 1325 of pedestal 1205 apart to cause deformation of openings 1220 and 1225 to create an interference fit between pedestal 1205 and frame 105. In various embodiments, multiple spring brackets could also be used. For example, a spring bracket like spring bracket 1210 may also be used on surface 1325 of pedestal 1205 to double the force that may be applied to frame 105.

FIG. 14 is a perspective view of a sixth example embodiment 1400 of a modular transportation seat frame with a frame 1405 and two pedestals 1410 and 1415 configured to telescopically receive the frame 1405. Pedestals 1410 and 1415 are similar to pedestal 605 of FIGS. 6 and 7 and pedestal 805 of FIGS. 8 and 9, in that pedestals 1410 and 1415 have bosses and deformation mechanisms that are similar to pedestal 605, while having an overall shape and configuration similar to pedestal 805.

Frame 1405 is similar to frame 105 of FIGS. 1-5, but has free beams on both ends of frame 105 to accommodate being telescopically received within the openings of the pedestals, from both ends of frame 105. Accordingly, as shown in FIG. 14, frame 1405 may be received into the openings of multiple pedestals in embodiments where a frame will not be connected to wall. Frame 1405 may be used with any of the pedestals described herein in various embodiments. In addition, in various embodiments, any of the frames described herein, including frames 105 and 1405 may also accommodate more than one pedestal on one end of the frame. If desired, more than one pedestal may be slid onto the same open end of a frame. In this way, a frame may accommodate two or more pedestals, either as shown in FIG. 14 or in other configurations.

Figure 15A:
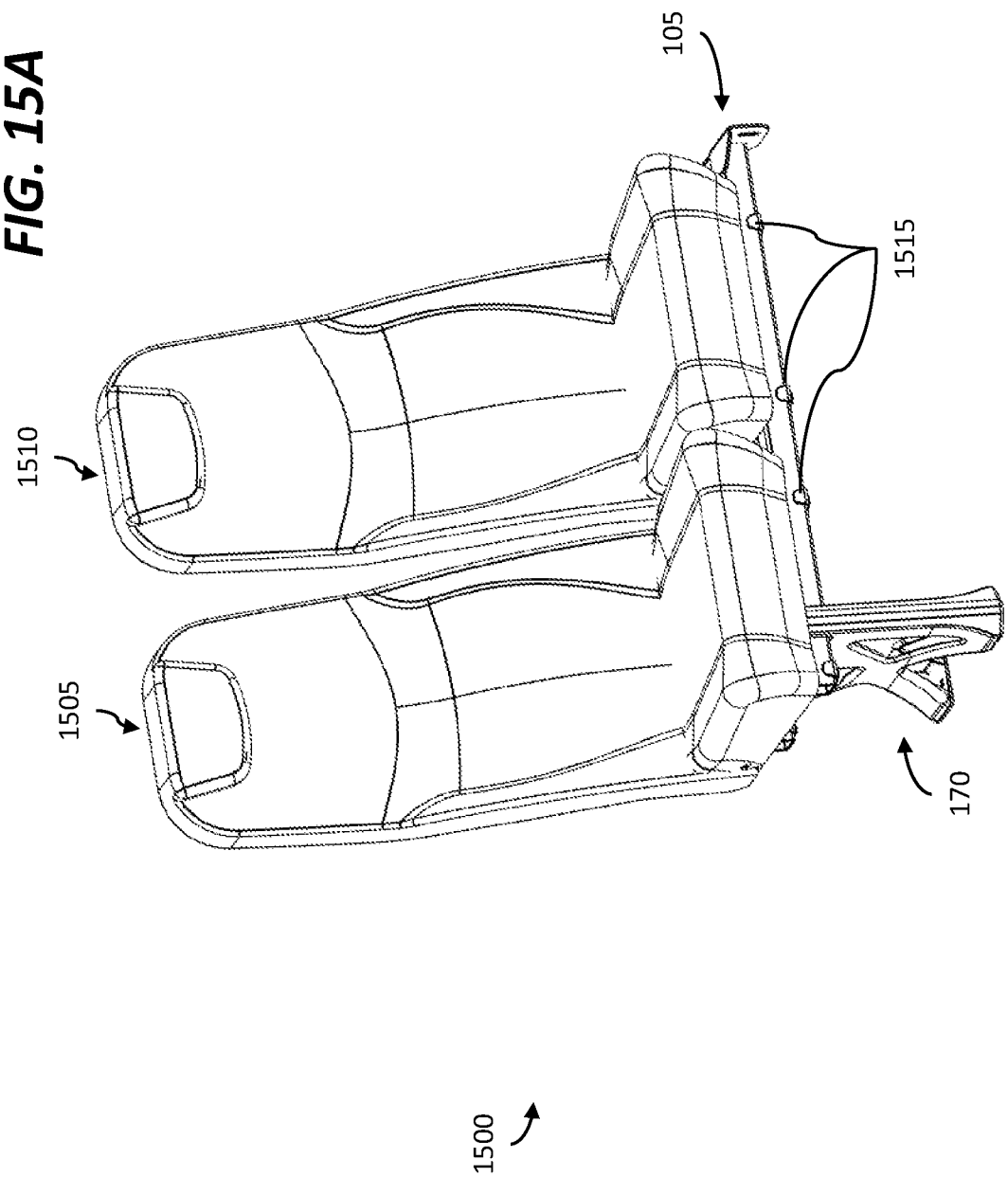
FIG. 15A is a top, front side perspective view of the first example embodiment of a modular transportation seat frame of FIG. 1, with seats installed thereon.

FIG. 15A is a top, front side perspective view of a seat assembly 1500 including the first example embodiment of a modular transportation seat frame of FIG. 1 and seats 1505 and 1510 installed thereon. FIG. 15B is a rear, bottom side perspective view of seat assembly 1500. In particular, the example of FIGS. 15A and 15B shows two individual seats 1505 and 1510 installed on a frame 105 and pedestal 170 (e.g., from the examples shown in FIGS. 1-5).

Seats 1505 and 1510 are secured to frame 105 with bolts and brackets 1515, where the bolts pass through holes in beams of frame 105 to attach seats 1505 and 1510 to frame 105. Notably, seats 1505 and 1510 are not attached to pedestal 170. Accordingly, pedestal 170 (or any other pedestal used in other embodiments) may still move with respect to frame 105 and/or seats 1505 and 1510 over beams of frame 105. Movement of pedestal 170 may be confined to movement between brackets of the seats 1505 and 1510, but such movement may still assist in configuring a pedestal 170 as desired before attaching pedestal 170 to a floor of a transportation vehicle and/or causing an interference fit between pedestal 170 and frame 105. In various embodiments, other types of seats may be used, such as a bench seat that accommodates more than one passenger. Other types of frames or pedestals may also be used, such as the various frames and pedestals described herein throughout.

FIG. 16 is a flow chart illustrating an example method 1600 for installing a modular transportation seat frame in a transportation vehicle. For example, method 1600 may be practiced by an installer of seat frames in an interior of a transportation vehicle as described herein.

Method 1600 may include step 1602 that includes sliding open or free ends of beams (e.g., free ends 150 and 155 of beams 130 and 135 as shown in FIGS. 1-5) of a frame portion (e.g., frame 105) of a modular transportation seat frame into apertures of a pedestal (e.g., apertures 160 and 165 of pedestal 105, apertures 830 and 840 of pedestal 805, apertures 1020 and 1025 of pedestal 1005, apertures 1220 and 1225 of pedestal 1205) of a modular transportation seat frame, where the pedestal is configured to support the frame portion. The beams may include a first end connected to an attachment portion of the frame portion and a second end (e.g., the open or free ends) opposite the first end. That second end (e.g., the open or free ends) are the ends that are slid telescopically into the apertures of the pedestal to a desired position as described herein.

Method 1600 may include step 1604 that includes attaching the attachment portion of the frame portion to a wall of a transportation vehicle. The frame portion is also configured to support a transportation seat that may be installed thereon after the modular transportation seat frame is installed in a transportation vehicle (e.g., according to method 1600). The attachment portion of the frame portion may be bolted to the wall, welded to the wall, or fastened/attached to the wall in any other manner.

Method 1600 may further include step 1606 that includes attaching the bottom of the pedestal to a floor of the transportation vehicle. The pedestal may be bolted to the floor, welded to the floor, or fastened/attached to the floor in any other manner.

Method 1600 may further include step 1608 that includes adjusting preinstalled hardware (e.g., bolt 330/nut 420 combination of FIGS. 3-5, bolt 615/nut combination of FIGS. 6 and 7, bolt 820/nut combination of FIGS. 8 and 9, set screws 1010 and 1015 of FIGS. 10 and 11, spring bracket of FIGS. 12 and 13) on the pedestal to deform the pedestal, to create an interference fit between the at least one aperture of the pedestal and the at least one beam of the frame as described herein to reduce or eliminate rattling between the pedestal and the frame portion.

The steps of method 1600 may be performed in the order presented in FIG. 16, or may be performed in other orders or with additional or fewer steps. For example, a frame portion may be attached to a wall (step 1604) before apertures of a pedestal are slid over the free ends of the frame portion (step 1602). In addition, an intermediate step not detailed in FIG. 16 may be performed of adjusting the location of the pedestal with respect to the frame portion to a desired position by sliding the pedestal with respect to the frame portion (or such an intermediate step may be performed as a part of step 1602). Such a step of sliding the pedestal to a desired position may be performed before and/or after the frame portion is attached to the wall (step 1604). In another example, an interference fit may be achieved (e.g., by tightening preinstalled hardware in step 1608) before and/or after the frame portion is attached to the wall of the transportation vehicle (step 1604) and/or before and/or after the pedestal is attached to the floor of the transportation vehicle (step 1606). In another example, the step of sliding a second pedestal onto a frame may additionally be performed (e.g., if frame 1405 of FIG. 14 is used) and other steps of causing an interference fit between the second pedestal and the frame, as well as attaching the second pedestal to the floor of a transportation vehicle, may be performed. In such an example, the step of attaching the frame to a wall of a transportation vehicle may be omitted. In another example, an additional step of installing a seat assembly on the frame portion of the modular transportation seat frame may be performed. As just one example, the seat assembly may be installed on the frame portion after each of the steps 1602, 1604, 1606, and 1608 of method 1600 are performed.

Although the modular support frame systems, methods, and apparatuses described herein have been discussed with respect to their installation in various types of transportation vehicles, their use is not so limited. For example, the modular transportation seat frames described herein may also find use in buildings, in or on indoor/outdoor structures, outdoors, or anywhere else that has a wall and a floor in which seats may be desired. In addition, the methods for installing the modular transportation seat frames described herein may also be practiced in locations other than a transportation vehicle. Similarly, the modular transportation seat frames and methods for installing the modular transportation seat frames described herein may be installed in a portion of a transportation vehicle, building, or other structure that is not yet completely built. For example, a park may include a floor surface and a wall surface (e.g., made out of concrete). The modular transportation seat frame could be used to install permanent (e.g., non-movable) seats in the park by attaching the seats to the modular frame that may be anchored to the floor surface and the wall surface. In other words, the modular transportation seat frame and methods for installing it herein may be used in any setting that includes a wall-type surface and floor-type surface, whether in a vehicle or not.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Methods and/or processes are set forth herein as comprising one or more "steps." Such steps are not required to be performed in any particular order except as mandated by logic or as specifically set forth in the claims.

What is claimed is:

1. An apparatus comprising:
a frame configured to support a transportation seat, in which the frame comprises at least one beam extending from a first end and terminating at a second end; and
a pedestal configured to support the frame, in which the pedestal comprises:
at least one leg portion configured to attach to a floor of a transportation vehicle, and
at least one aperture configured to telescopically receive the second end of the at least one beam, in which the at least one beam is slid ably moveable within the at least one aperture,
and further in which the pedestal is configured to deform to, in turn, change a shape or an orientation of the at least one aperture relative to the at least one beam telescopically received therein.

2. The apparatus of claim 1, in which the at least one beam comprises at least a first beam and a second beam.

3. The apparatus of claim 2, in which the frame further comprises an attachment portion configured to attach to a wall of a transportation vehicle, and further in which the first end of each of the first beam and the second beam is attached to the attachment portion.

4. The apparatus of claim 3, in which the attachment portion, the first beam, and the second beam generally form a U-shape.

5. The apparatus of claim 3, in which the first beam and the second beam are each oriented generally perpendicular to the attachment portion.

6. The apparatus of claim 2, in which the frame further comprises a lateral support member attached to the first beam and the second beam, and wherein the lateral support member is oriented generally perpendicular to the first beam and the second beam.

7. The apparatus of claim 6, in which the lateral support member is attached to the first beam and the second beam at approximately a midpoint between the first end and the second end of the first beam and the second beam.

8. The apparatus of claim 2, in which the at least one aperture comprises a first aperture configured to receive the first beam and a second aperture configured to receive the second beam.

9. The apparatus of claim 2, in which the pedestal is a first pedestal, and further in which the first end of each of the first beam and the second beam is further configured to be telescopically received within two apertures of a second pedestal such that the first beam and the second beam are slid ably moveable within the two apertures of the second pedestal.

10. The apparatus of claim 1, in which the at least one aperture has a shape corresponding to the shape of the second end of the at least one beam.

11. The apparatus of claim 10, in which the second end of said at least one beam and said at least one aperture each have substantially corresponding square shapes.

12. The apparatus of claim 1, in which the frame and the pedestal are configured to structurally support the transportation seat without the use of additional hardware connecting the frame and the pedestal.

13. The apparatus of claim 1, in which the frame and the pedestal are configured to be installed on either of a curbside or street side of the transportation vehicle.

14. The apparatus of claim 1, in which the change of the shape or the orientation of the at least one aperture is configured to create an interference fit between the at least one aperture and the at least one beam telescopically received in the at least one aperture.

15. The apparatus of claim 14, in which the interference fit prevents the frame from rattling within the at least one aperture of the pedestal during use.

16. The apparatus of claim 1, in which the frame further comprises hardware configured to adjust the shape or the orientation of the at least one aperture within the pedestal, relative to the at least one beam telescopically received therein.

17. The apparatus of claim 16, in which the hardware is preinstalled on the frame.

18. The apparatus of claim 17, in which the hardware comprises a bolt restrained within a first boss on a first surface of the frame and further restrained within a second boss on a second surface of the frame.

19. The apparatus of claim 18, in which the hardware further comprises a nut attached to the bolt, and rotation of the nut and the bolt with respect to one another to draw the nut toward a head of the bolt deforms the first surface and the second surface of the pedestal.

20. The apparatus of claim 18, in which the first surface comprises a first opening and the second surface comprises a second opening aligned with said first opening, said first and second openings co-operating with one another to form the at least one aperture.

21. The apparatus of claim 16, in which the hardware comprises a spring bracket configured to exert a first force against a first surface of the frame and a second force against a second surface of the frame, to cause the deformation of the pedestal.

22. An apparatus comprising:
a frame configured to support a transportation seat, in which the frame comprises at least one beam extending from a first end and terminating at a second end; and
a pedestal configured to support the frame, in which the pedestal comprises:
at least one leg portion configured to attach to a floor of a transportation vehicle,
at least one aperture configured to telescopically receive the second end of the at least one beam, in which the at least one beam is slidably moveable within the at least one aperture, and
a distortion member configured to distort a shape of the at least one aperture such that, after telescopically receiving the at least one beam within the at least one aperture, a distortion of the shape of the at least one aperture locks the at least one beam within the at least one aperture of the pedestal.

23. A method comprising:
sliding at least one beam of a frame into at least one aperture of a pedestal configured to support the frame, in which the at least one beam includes a first end connected to an attachment portion of the frame and a second end opposite the first end, and further wherein the second end is slid into the at least one aperture;
attaching the attachment portion of the frame to a wall of a transportation vehicle, in which the frame is configured to support a transportation seat;
attaching the pedestal to a floor of the transportation vehicle; and
adjusting preinstalled hardware on the pedestal to deform the pedestal upon adjustment of said hardware, causing an interference fit between the at least one aperture of the pedestal and the at least one beam of the frame.

* * * * *